US011064660B1

(12) United States Patent
Adams et al.

(10) Patent No.: US 11,064,660 B1
(45) Date of Patent: Jul. 20, 2021

(54) PORTABLE APPARATUS FOR GROWING VEGETATION

(71) Applicants: Craig Adams, East Meadow, NY (US); David Orologio, Mineola, NY (US)

(72) Inventors: Craig Adams, East Meadow, NY (US); David Orologio, Mineola, NY (US)

( * ) Notice: Subject to any disclaimer, the term of this patent is extended or adjusted under 35 U.S.C. 154(b) by 426 days.

(21) Appl. No.: 16/004,699

(22) Filed: Jun. 11, 2018

Related U.S. Application Data

(60) Provisional application No. 62/517,603, filed on Jun. 9, 2017.

(51) Int. Cl.
| | |
|---|---|
| *A01G 9/20* | (2006.01) |
| *A01G 9/24* | (2006.01) |
| *A01G 7/04* | (2006.01) |
| *A01G 7/02* | (2006.01) |
| *A01G 9/26* | (2006.01) |
| *A01G 29/00* | (2006.01) |
| *A01G 27/00* | (2006.01) |

(52) U.S. Cl.
CPC ............... *A01G 9/20* (2013.01); *A01G 7/02* (2013.01); *A01G 7/045* (2013.01); *A01G 9/24* (2013.01); *A01G 9/246* (2013.01); *A01G 9/247* (2013.01); *A01G 9/26* (2013.01); *A01G 27/003* (2013.01); *A01G 29/00* (2013.01)

(58) Field of Classification Search
CPC . A01G 9/20; A01G 9/24; A01G 9/246; A01G 9/249; A01G 9/26; A01G 9/18; A01G 9/16; A01G 9/14; A01G 7/02; A01G 7/04; A01G 7/045; A01G 29/00; A01G 9/247; A01G 27/003
See application file for complete search history.

(56) References Cited

U.S. PATENT DOCUMENTS

| | | | | |
|---|---|---|---|---|
| 3,673,733 A | * | 7/1972 | Allen ..................... | A01G 9/246 47/17 |
| 4,224,765 A | * | 9/1980 | Song ..................... | A01G 9/028 220/326 |
| 10,123,489 B2 | * | 11/2018 | He ......................... | A01G 9/20 |

(Continued)

FOREIGN PATENT DOCUMENTS

| | | | | |
|---|---|---|---|---|
| CN | 101091443 A | * | 12/2007 | ............... A01G 9/16 |
| CN | 104756794 A | * | 7/2015 | ............... A01G 9/20 |

(Continued)

OTHER PUBLICATIONS

Machine translation of KR 20130094964 to Lee, published Aug. 2013.*

(Continued)

*Primary Examiner* — Kathleen I Alker
(74) *Attorney, Agent, or Firm* — Collard & Roe, P.C.

(57) ABSTRACT

A system can be installed in a cabinet for growing plants. The system has a divider. The divider hermetically separates a plant space of the cabinet from a control space of the cabinet. The divider has a plant side, a control side, and electro-magnetic radiation (EMR) emitters, mounted on the plant side of the divider. The EMR emitters are adapted to EMR frequencies primarily at or near visible light. There is a filtered vent in the divider. The filtered vent has an air filter, a fan for pulling air through the filtered vent, and a microprocessor. The microprocessor controls the fan and the EMR emitters.

8 Claims, 22 Drawing Sheets

(56) References Cited

U.S. PATENT DOCUMENTS

| | | | | |
|---|---|---|---|---|
| 2003/0005626 A1* | 1/2003 | Yoneda | ................ | A01G 9/249 47/69 |
| 2016/0345513 A1* | 12/2016 | Lo | ..................... | A01G 7/045 |
| 2018/0042193 A1* | 2/2018 | Scanlon | ................ | A01H 3/00 |

FOREIGN PATENT DOCUMENTS

| | | | | | |
|---|---|---|---|---|---|
| CN | 105309218 A | * | 2/2016 | ............... | A01G 9/02 |
| CN | 106171663 A | * | 12/2016 | ............... | A01G 9/16 |
| CN | 106576975 A | * | 4/2017 | ............ | A01K 63/003 |
| ES | 1073388 U | * | 12/2010 | ............... | A01G 9/16 |
| JP | 2018019667 A | * | 2/2018 | ............ | H05B 47/16 |
| KR | 20130094964 A | * | 8/2013 | ............ | A01G 7/045 |
| WO | WO-2009119778 A1 | * | 10/2009 | ............ | A01G 31/06 |
| WO | WO-2013153364 A1 | * | 10/2013 | ............ | A01G 27/06 |
| WO | WO-2014017705 A1 | * | 1/2014 | ............ | F21V 29/83 |
| WO | WO-2015111487 A1 | * | 7/2015 | ........... | F21V 7/0008 |
| WO | WO-2017218430 A1 | * | 12/2017 | ............ | H05B 45/37 |

OTHER PUBLICATIONS

Machine translation of WO 2009119778 to Uchiyama, published Oct. 2009.*

* cited by examiner

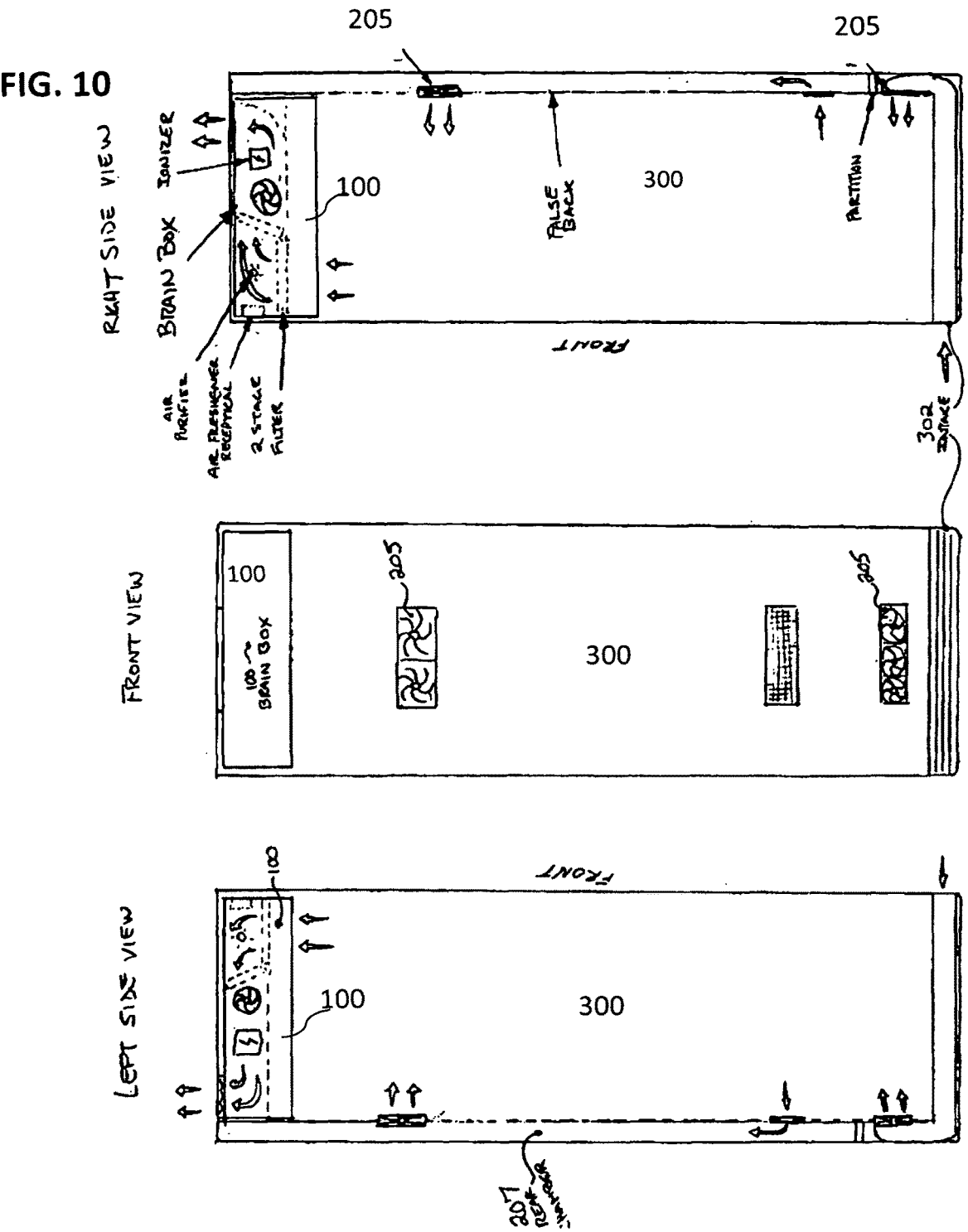

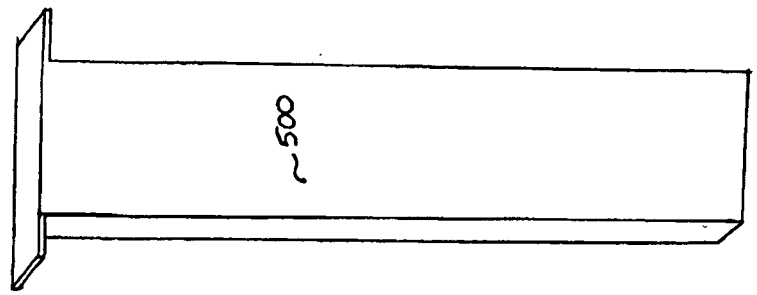
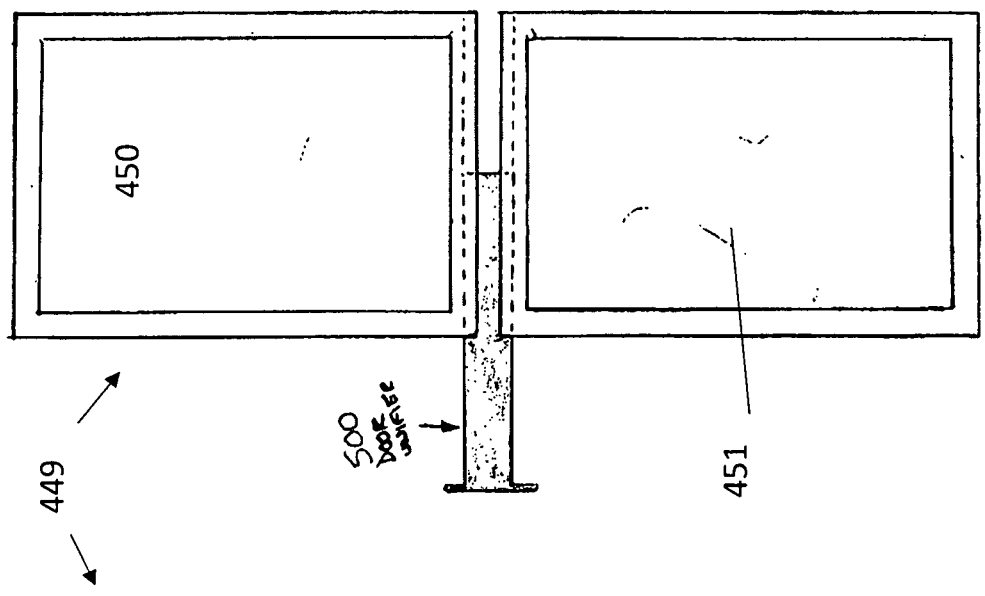
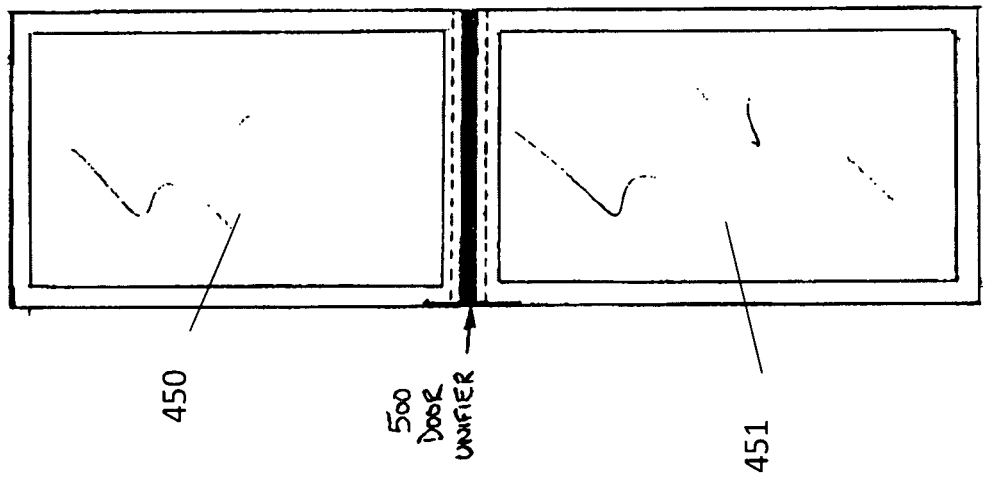

FIG. 17
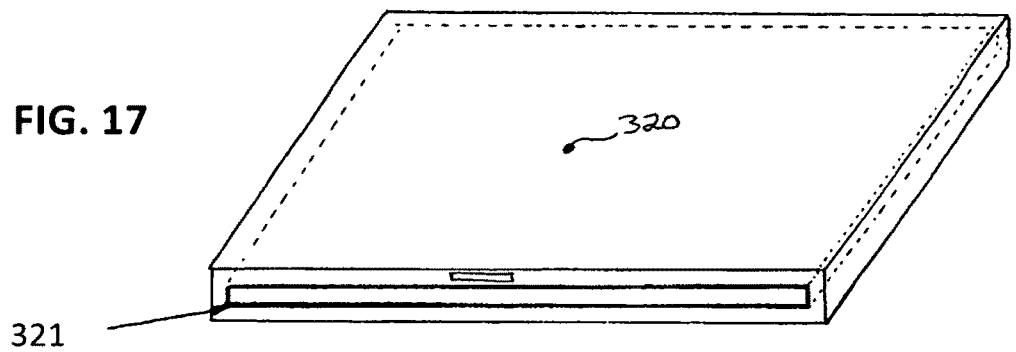
321
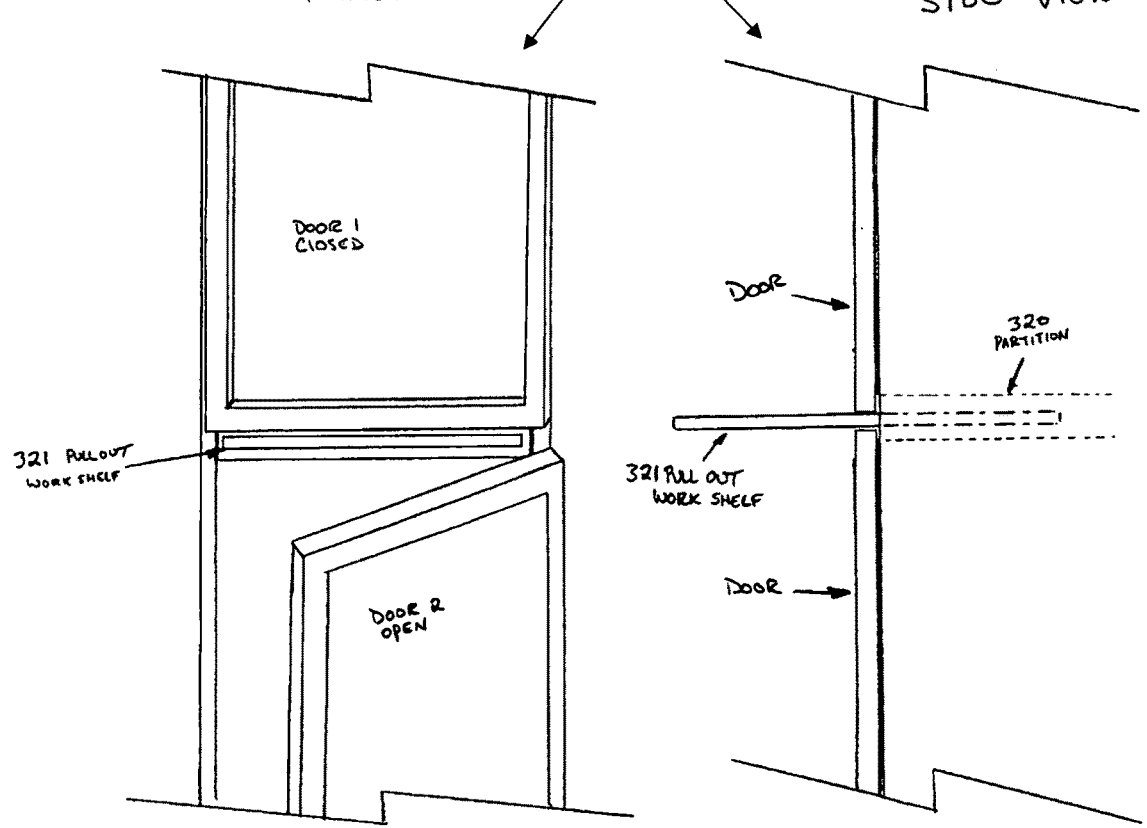
FIG. 17A FIG. 17B

FIG. 18
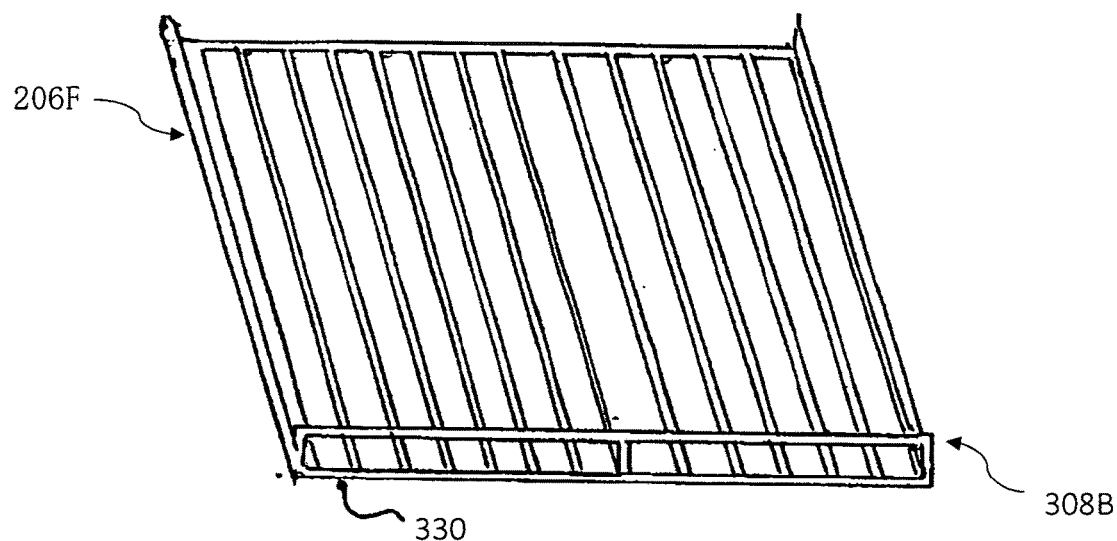
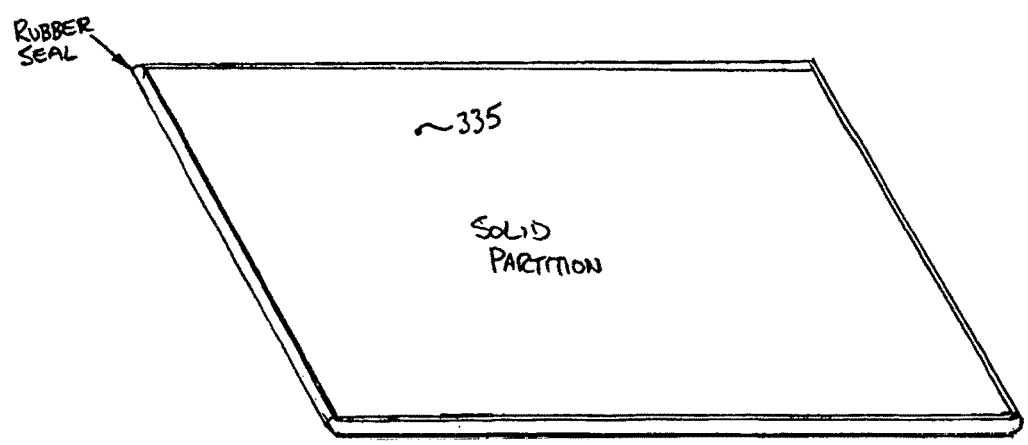

440

442 DRAINAGE SLOTS

440

PORTABLE APPARATUS FOR GROWING VEGETATION

FIELD OF THE DISCLOSURE

The present disclosure relates to exemplary embodiments of a portable apparatus for growing vegetation, and more particularly, to a portable apparatus for growing vegetation indoors.

BACKGROUND OF THE INVENTION

Various plants are grown indoors. Various grow lights, and timing for grow lights can be particularly useful in producing varieties that have desired qualities. Some of these qualities can be medicinally useful, as shown in U.S. Pat. No. 6,630,507 for Cannabinoids As Antioxidants And Neuroprotectants, to Hampson, et al., Oct. 7, 2003, Assigned to: The United States of America as represented by the Department of Health and Human Services (Washington, D.C.), the Abstract of which teaches:

"Cannabinoids have been found to have antioxidant properties, unrelated to NMDA receptor antagonism. This new found property makes cannabinoids useful in the treatment and prophylaxis of wide variety of oxidation associated diseases, such as ischemic, age-related, inflammatory and autoimmune diseases. The cannabinoids are found to have particular application as neuroprotectants, for example in limiting neurological damage following ischemic insults, such as stroke and trauma, or in the treatment of neurodegenerative diseases, such as Alzheimer's disease, Parkinson's disease and HIV dementia. Nonpsychoactive cannabinoids, such as cannabidoil, are particularly advantageous to use because they avoid toxicity that is encountered with psychoactive cannabinoids at high doses useful in the method of the present invention. A particular disclosed class of cannabinoids useful as neuroprotective antioxidants is formula (I) wherein the R group is independently selected from the group consisting of H, CH.sub.3, and COCH.sub.3. ##STR1 ##"

BRIEF DESCRIPTION OF THE PRESENT INVENTION

The present invention provides a programmable indoor environment, that can be installed and employed in any space including but not limited to installed in a cabinet or in a refrigerator, even an old or non-functional refrigerator, or can be sold installed a cabinet of various exterior styles. The cabinet is preferably of a standard cabinet size.

A barrier divides a compartment into a growing space or plant space, and an exhaust space. The barrier further comprises: means for moving air, a filter, Light Emitting Diodes (LEDs), and a programmable computer for regulating the timing and frequencies emitted by the LEDs.

The LEDs emit various frequencies of electro-magnetic radiation (EMR or radiation) at or near the visible frequencies of light, including infra-red and ultra-violet. For many plants, modules of white LEDs are satisfactory, and may be chosen by the user. For specific plant varieties that have characteristics such as producing substances, such as the neuroprotective antioxidants described in the Hampson, et al Patent, the timing and frequencies of such emissions can be particularly helpful in achieving the desired characteristics and products in the plant. LEDs emitting specialized frequencies may be sold in modules that easily plug into the barrier.

These LED modules are mounted on mounts similar to mounts for fluorescent light tubes. These LED tubes are easily changed, to change the frequencies or colors emitted.

These LED tubes are easily changed even by some persons who are handicapped by diseases such as Multiple Sclerosis, or by the disabling ailments described in Hampson, et al. The LED tubes can be changed by a person in a wheelchair.

There is literature and ongoing research by others into what colors, temperatures, $CO_2$ concentrations, and timings produce the best yields of desired products from various varieties. The changeability of the LEDs and programmability of emission timings makes this device particularly responsive to new discoveries and grow methods.

BRIEF DESCRIPTION OF THE DRAWINGS

FIG. 10 is: a left side elevation; a front elevation; and a right side elevation of the cabinet, with the brain box in place, showing ventilation.

FIG. 11A is a front elevation of a Dutch door, with its top and bottom sections joined by a door unifier.

FIG. 11B is a front elevation of a Dutch door with the door unifier removed halfway.

FIG. 11C is an oblique view of the door unifier.

FIG. 17 is an oblique view of a horizontal partition comprising a pull-out work shelf.

FIG. 17A is a front view of the Dutch door with the pull-out work shelf.

FIG. 17B is a side view of the Dutch door with the pull-out work shelf pulled out.

FIG. 18 is an oblique view and of a wire frame shelf above a solid partition.

DETAILED DESCRIPTION OF EXEMPLARY EMBODIMENTS OF DISCLOSURE

The exemplary embodiments of the present disclosure can provide for a portable apparatus for growing vegetation indoors. The apparatus can give users the ability to grow any form of plants or vegetation in any indoor space including but not limited to the applicable housing device described herein. The apparatus can provide various illumination in various time cycles and color spectrums as well as growth stage specific time control, filtration and ventilation of heat and odor. The apparatus can also control the circulation of fresh air. The apparatus can be manually controlled or automated by use of electronic internal controls which can be programmed and or controlled wirelessly by way of Bluetooth, WIFI, Alexa and Nest. The apparatus can also give users the ability to control other devices related to the growth and cultivation of vegetation wirelessly. Exemplary embodiments of the methods and systems will now be described with reference to the figures.

Figure 1:
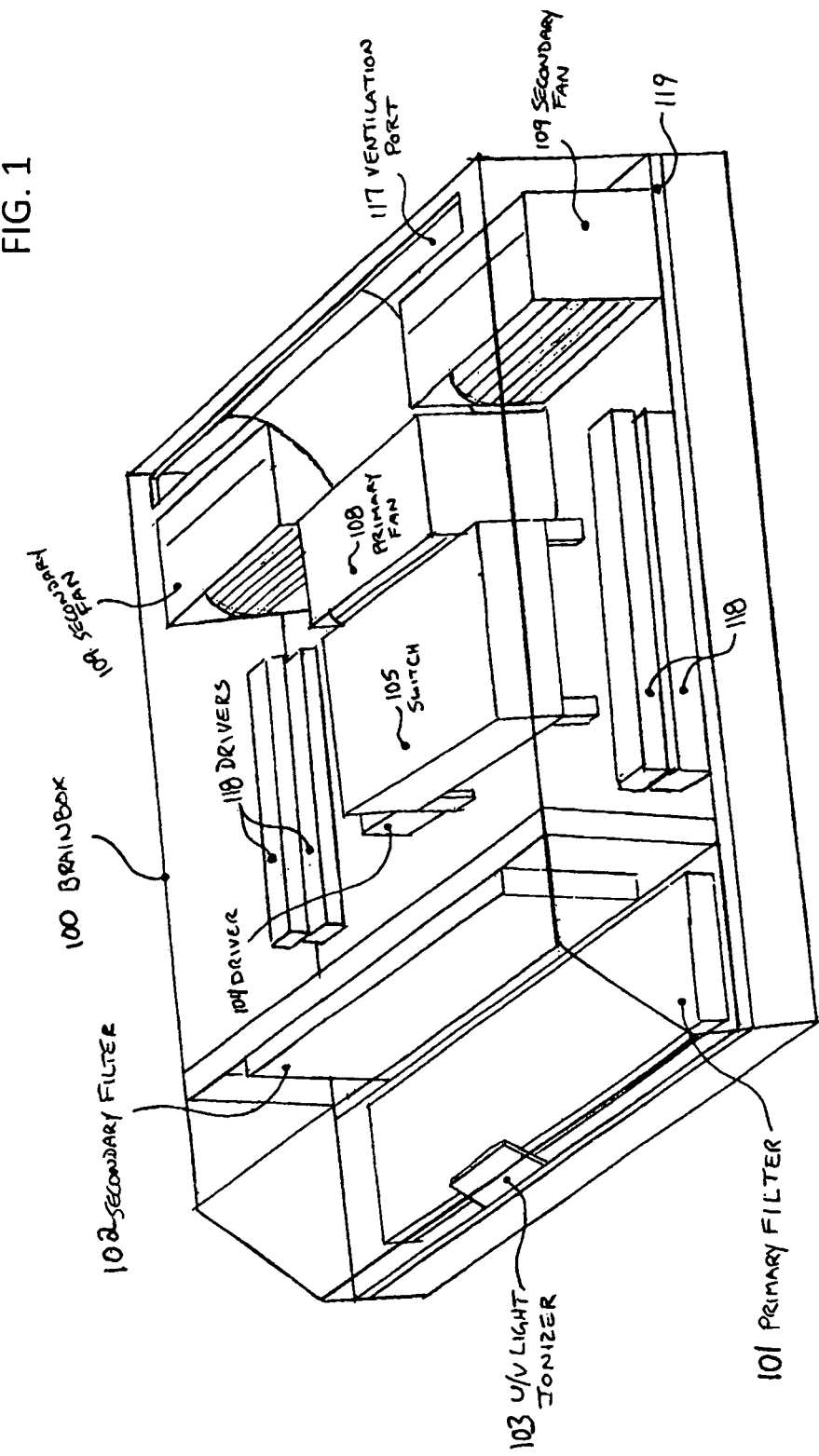
FIG. 1 is an oblique view of the brain box of the present invention.

FIG. 1 illustrates a brainbox 100 for use in the apparatus according to an exemplary embodiment of the present disclosure. The Brain box 100 comprises a computer or microprocessor 105, also herein called switch 105, as part of the apparatus, can be removable and accommodated in various spaces, and can have an upper chamber and a lower chamber or plant chamber. A divider or separation board or panel can separate the upper and lower chambers of the brainbox 100. In some exemplary embodiments, the divider or separation board or panel can be made of a heat sink material such as aluminum or anodized aluminum to provide additional heat dissipation by drawing heat from the lights up into the upper chamber to be ventilated out as described below. The Brain box 100 can have various sizes and dimensions which are based on the size of the apparatus into which it can be placed. In some exemplary embodiments, the Brainbox 100 can have approximately a 18" length, a 17" width and a 5" height, but the apparatus 100 is not limited to any particular size, dimension or shape. The Brainbox 100 can control all subsidiary devices within both the Housing apparatus 300 and reservoir apparatus 400 wirelessly.

As shown in FIG. 1, the upper chamber can have a primary air filter 101 and a secondary air filter 102. The upper chamber can have an air scrubbing UV light or ionizer 103. The upper chamber can have within it any number of electronic dimmable power supply/drivers 118 for the purpose of powering associated lights. Upper chamber can have an electronic power supply driver 104 for an additional green colored light for the purposes of providing illumination during darkness cycles. All lights are preferably light emitting diodes ("LEDs") but they can be any other light sources that can provide similar illumination. The upper chamber can have an electronic multiple channel switch 105 to control such items as a camera, lights and cooling fans as described below. Switch can wirelessly communicate with and control all components of housing apparatus 300 in FIGS. 8,9 and reservoir system 400 as described below. The switch can be wirelessly controlled, such as through Wi-Fi, Bluetooth, Alexa and Nest by way of software application. Switch can wirelessly communicate with external sensors for purposes of controlling and displaying the levels of carbon dioxide, humidity, temperature, and soil moisture, as described more fully below. The switch can also communicate with external lights, pumps, foggers, Carbon dioxide injectors, lighted partitions and a reservoir pump for purposes of timing and turning lights on and off, watering and feeding plants, increasing humidity and increasing carbon dioxide to the environment. The switch can communicate with a camera 501 for purposed of monitoring plants and grow space remotely.

The upper chamber can have a fan or series of fans for the purposes of maintaining fresh air flow, filtering air to remove impurities and odor, and for ventilating heat. Fans can be of various sizes and air flows, and in some exemplary embodiments, can have air flow of 60-80 cfm. Brainbox 100 can have one or more fan 108 for the purposes of maintaining 24-hour circulation of fresh air, maintaining of negative pressure and for filtering odor. The upper chamber can also have one or more secondary fans 109, for the purposes of filtering odor and ventilating excess heat, as demonstrated in FIG. 7. Secondary fans 109 can be activated or deactivated automatically by switch 105 according to temperature parameters established and programed by the user via software application. Upper chamber can have ionizer and UV light 103 for purposes of purifying air and activating titanium dioxide within filters 108 & 109.

As indicated FIG. 1, Brainbox 100 can have but is not limited to a primary air filter 101 and a secondary air filter 102 for the purpose of removing odor. Filters 101, 102 can be of granular carbon and titanium dioxide type. The filters may comprise activated charcoal. Filters are not limited to activated charcoal, granular carbon and titanium dioxide and can be of any other material that provides similar filtration. Filters 101, 102 can be reusable or disposable and can be removed or replaced by user through the underside of the Brainbox 100. The filters can be of various size and dimensions, and is not limited to any particular size or dimension.

Figure 2:
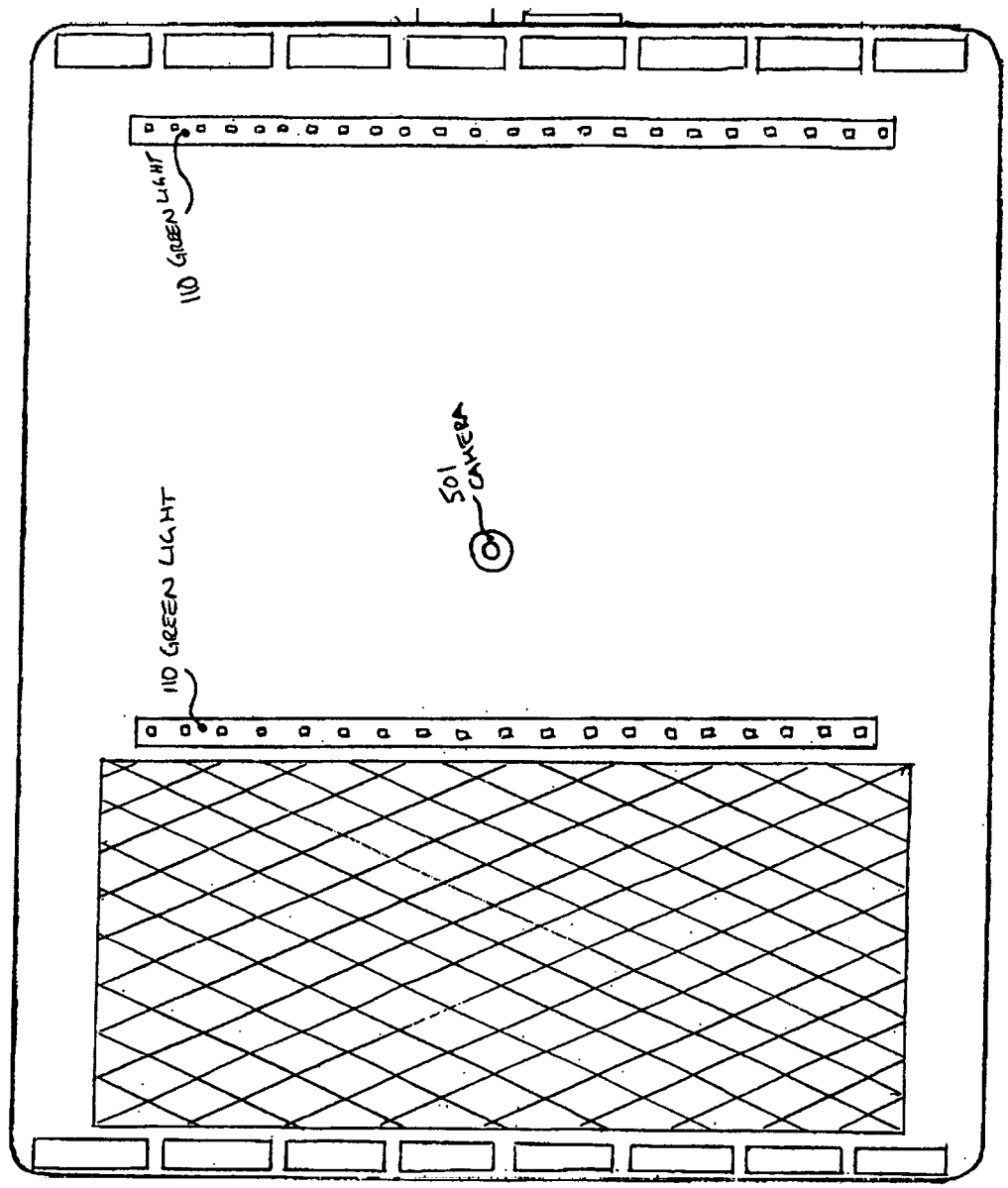
FIG. 2 is a bottom plan view of the brain box.
Figure 3:
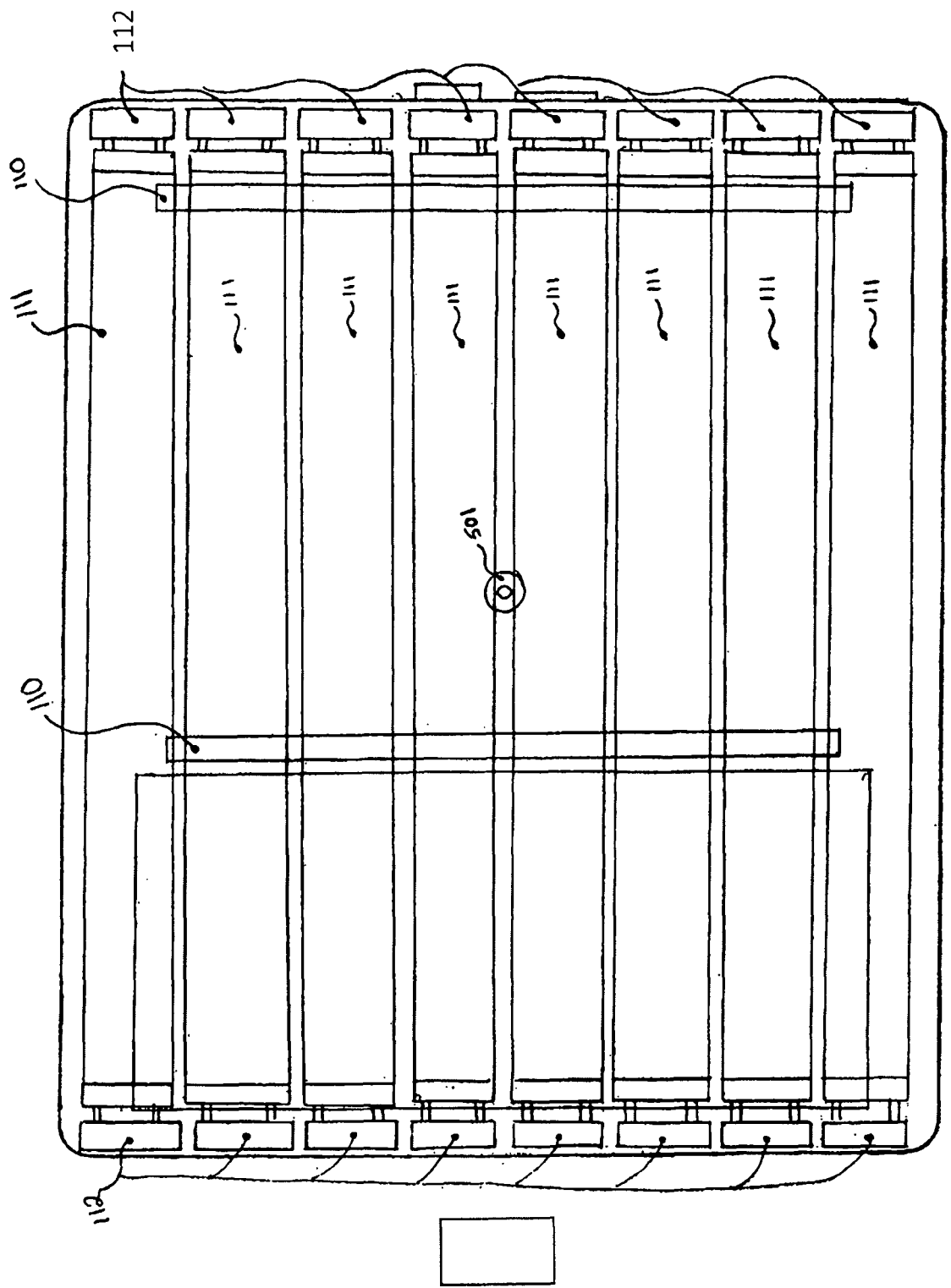
FIG. 3 is a bottom plan view of a movable partition including arrays of LEDs within translucent tubes.

As illustrated in FIGS. 2 & 3, the lower chamber can have a green light or lights 110. The green light or lights 110 can be wirelessly controlled by switch 105 as described in paragraph 0004. The lower chamber can also have a live action digital camera 501 for purposes of inspection of vegetation and grow space through WIFI, Bluetooth, Alexa and Next software application as described in paragraph 0004. In the lower chamber of the brainbox 100, lights can be provided that can provide light downward into the apparatus the brainbox is to be configured in or any space into which brainbox can be configured. Lower chamber can also have one or more small, low volume axial fans for heat sink and light cooling.

Figure 4:
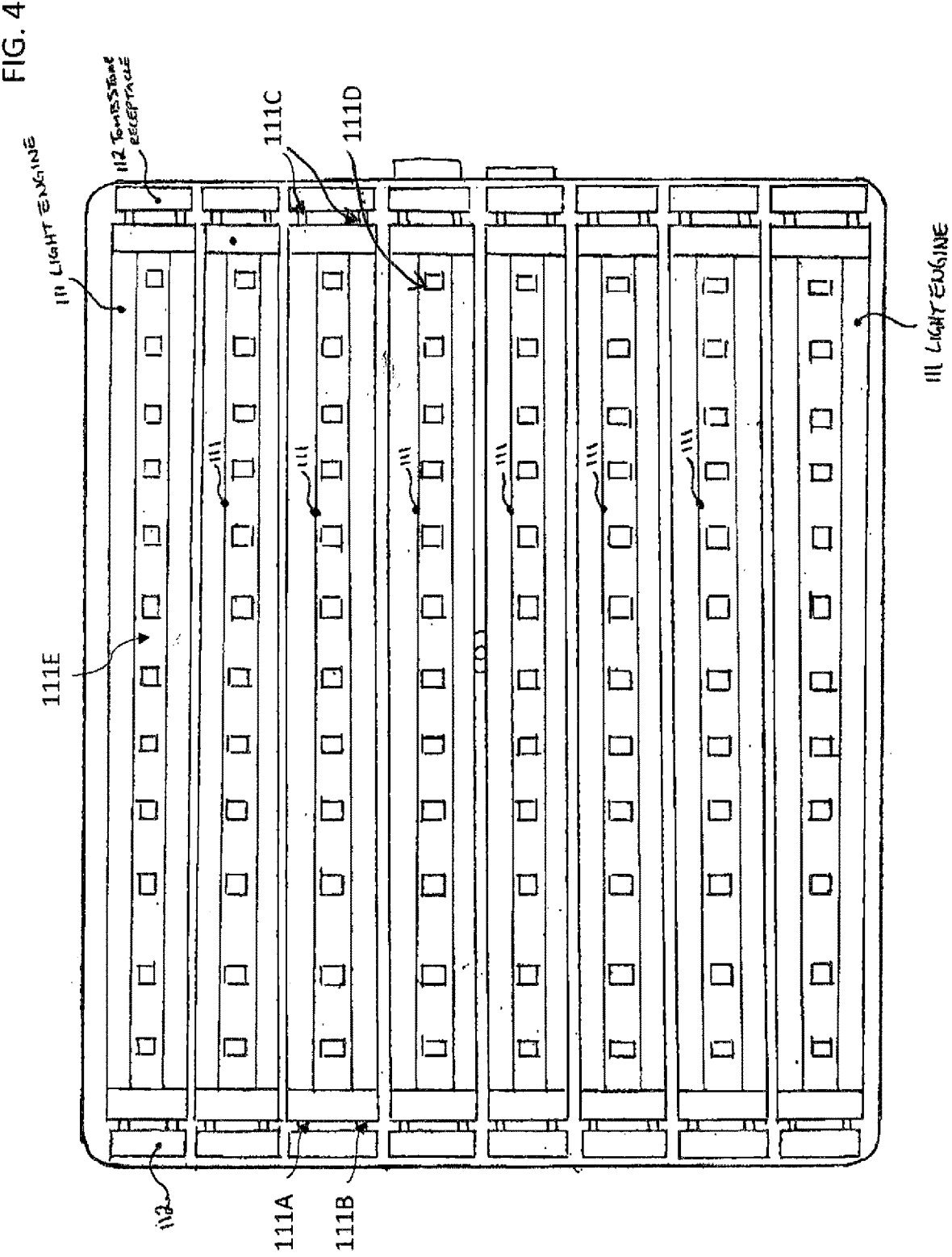
FIG. 4 is a similar bottom plan to showing the circuit boards and LED is within the tubes.

As illustrated in FIGS. 3 & 4, the lower chamber can have but is not limited to eight interchangeable and removable, tubular florescent styled light engines preferably shaped as translucent tubes 111. The tubes comprise a pair of mounting and power supply pins 111A and 111B, and a pair of similar mounting pins 111C on the opposite end of the tube. LEDs 111D are mounted on a circuit board 111E which is mounted within the tube 111.

Figure 5:
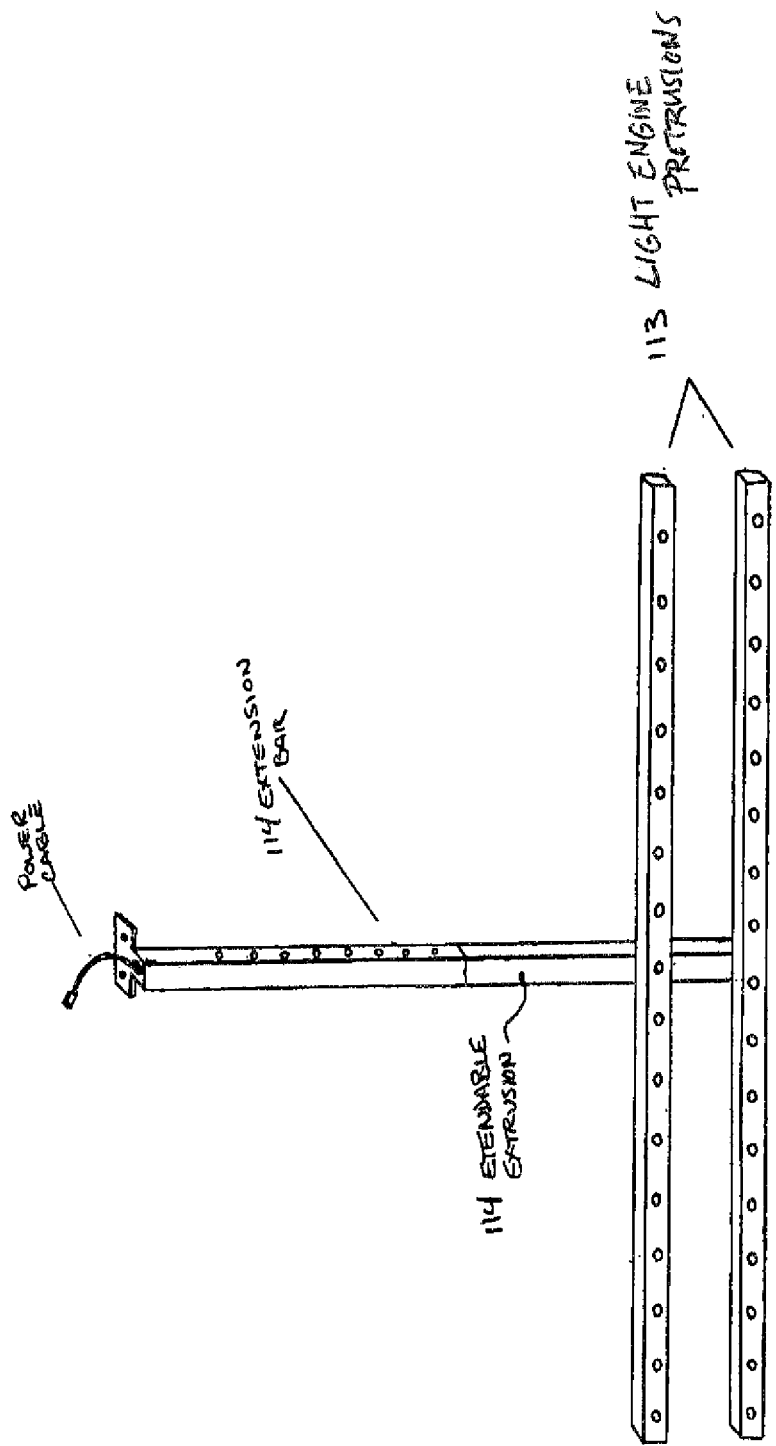
FIG. 5 is an oblique view of an optional sidelight attached.

The lights are grow lights that allow the vegetation or plants in the apparatus or space below the brainbox 100 to grow. The lights 111 can be wirelessly controlled, timed and or dimmed by switch 105 as described in paragraph 0004. The lights 111 can be of different intensities and colors to provide ideal color spectrums for various plant types and growth stages. The lights 111 can be provided on an extrusion style light bar or tube which can be easily removed or replaced by the user, depending on the vegetation in the apparatus. The lights 111 can be removed and replaced by a user, depending on the vegetation being grown. For example: adjusting color spectrum and light intensity. The extrusion or tube can be connected to a power source or sources provided in the upper chamber of the brainbox 100 and mounted to the ceiling of the lower chamber using any type of mechanism, such as but not limited to fluorescent light style powered tombstone style receptacles 112. Individual PCB light engines or single PCB light engine and optional vertical lighting protrusions 113 can extend downward from the brainbox 100 for the purpose of providing side lighting when brainbox is employed outside of housing apparatus 300 as illustrated in FIG. 5. Green lights for night cycle access can be provided and controlled by switch 105 in brainbox 100 or by a door switch on housing apparatus 300. Door switch can also control light engines in brainbox 100. A live action camera 501 can be provided for remote inspection of plants.

The lights 111 can be controlled by an automation timer with choice of on/off cycles determined by a user via Wi-Fi, Bluetooth, Alexa, or Nest using a software application. Various light cycle choices can be provided, such as 18 hours on and 6 hours off in a 24-hour cycle, 20 hours on and 4 hours off in a 24-hour cycle, and 12 hours on and 12 hours off in a 24-hour cycle. The light cycle choices are not restricted and can be change or customized by the user, via software application.

As shown in FIG. 5, light engine protrusions 113 can be provided that can work in tandem with the lights 111 that can be connected to the brain box 100. The light engine protrusions 113 can be attached to extendable extrusions 114 and can be received by brackets on the brain box 100. Wires can run inside the extrusions 114 and connected inside the brain box 100 for power.

Figure 6:
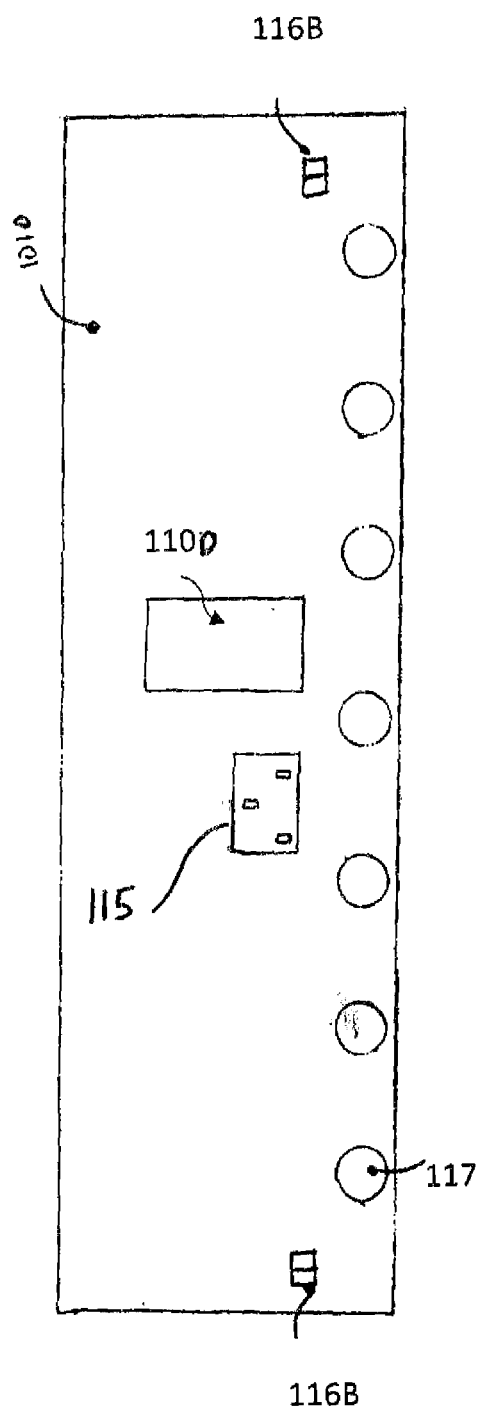
FIG. 6 is a rear elevation of the rear panel of the brain box.

FIG. 6 illustrates the rear panel 1010 of the Brainbox 100. The rear panel 1010 can have a receptacle 115 to accommodate an electrical power cord. The rear panel can have a temperature, humidity, and CO2 sensor 1100. Sensor 1100 can communicate with switch 105 for the purpose of relaying, displaying and controlling temperature, humidity and CO2. The rear panel 1010 can have ventilation ports or slots 117 to allow airflow for the purpose of cooling light engines 111 as described below and illustrated in FIG. 6. The rear panel of the brainbox can have receptacles 116B for connecting external light engine protrusion 113 to power source in upper chamber of brain box 100.

Figure 7:
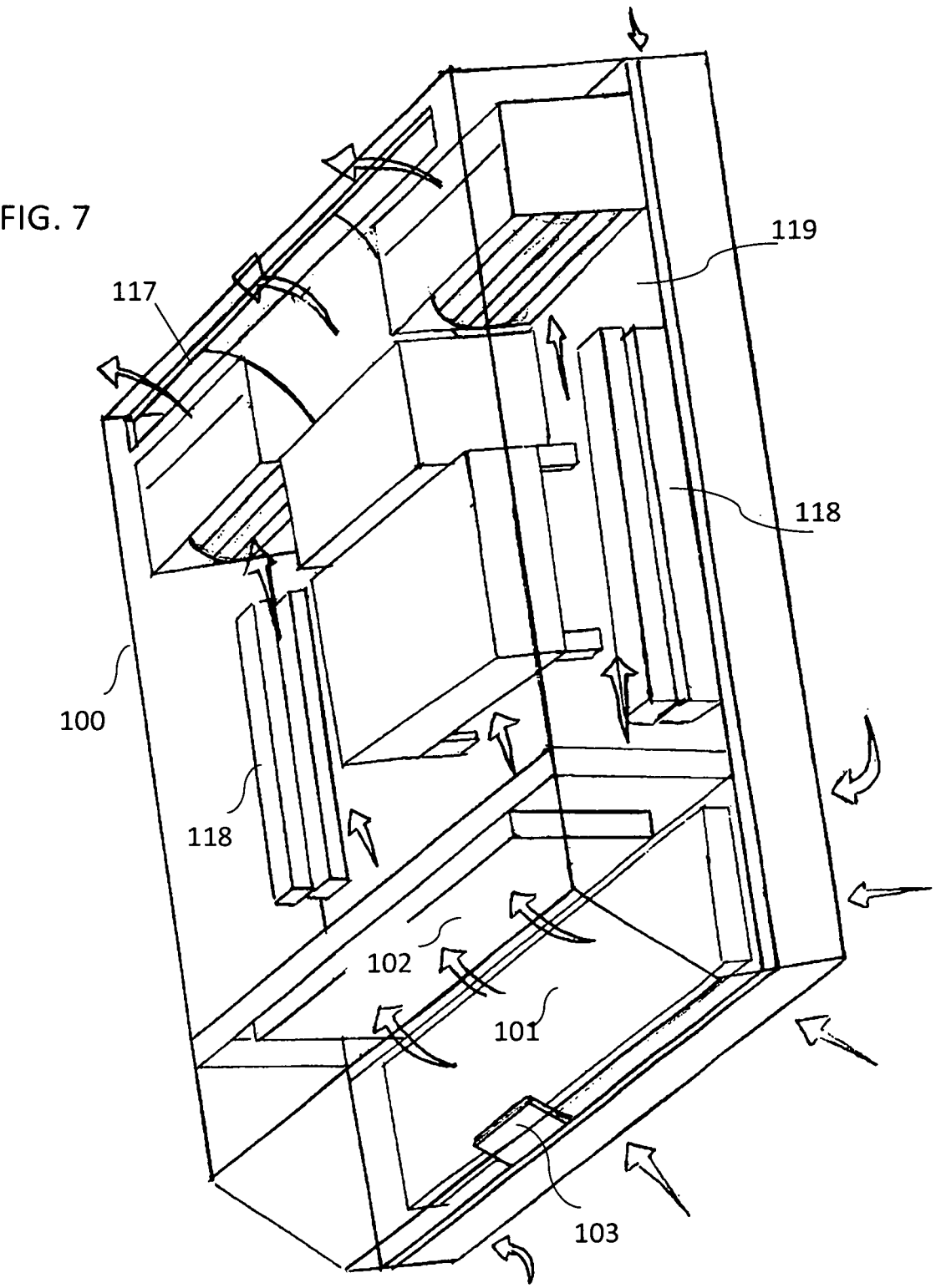
FIG. 7 is an oblique view of the brain box similar to FIG. 1 showing air flow through the brain box 100.

FIG. 7 illustrates how air is drawn from below brainbox 100, moved across light engines 111, through filter 101, exposed to air scrubbing light or ionizer 103, then through secondary filter 102, to clean and remove odor from air as it enters the upper chamber of the Brainbox 100. Air is then moved through the upper chamber whereby removing heat from drivers 118 and separation panel 119 and finally expelled through an opening 117 in the top of the Brainbox 100. In some exemplary embodiments, the air can be ventilated through an opening in the rear of the Brainbox 100. Various ventilation adapters can be provided for the exhaust air.

Figure 8:
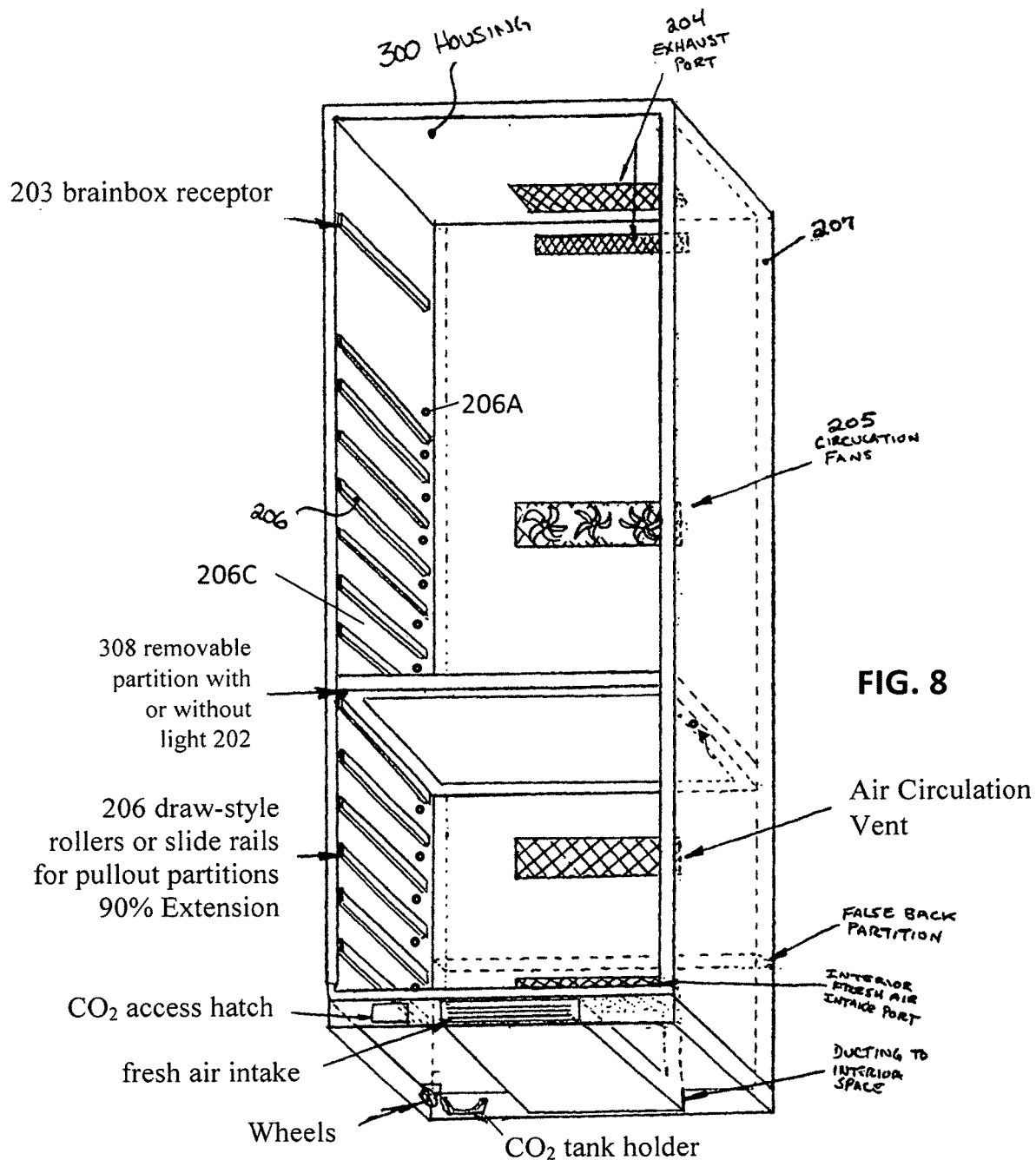
FIG. 8 a is an oblique view of a cabinet used for the present invention showing air vents and a single partition.
Figure 9:
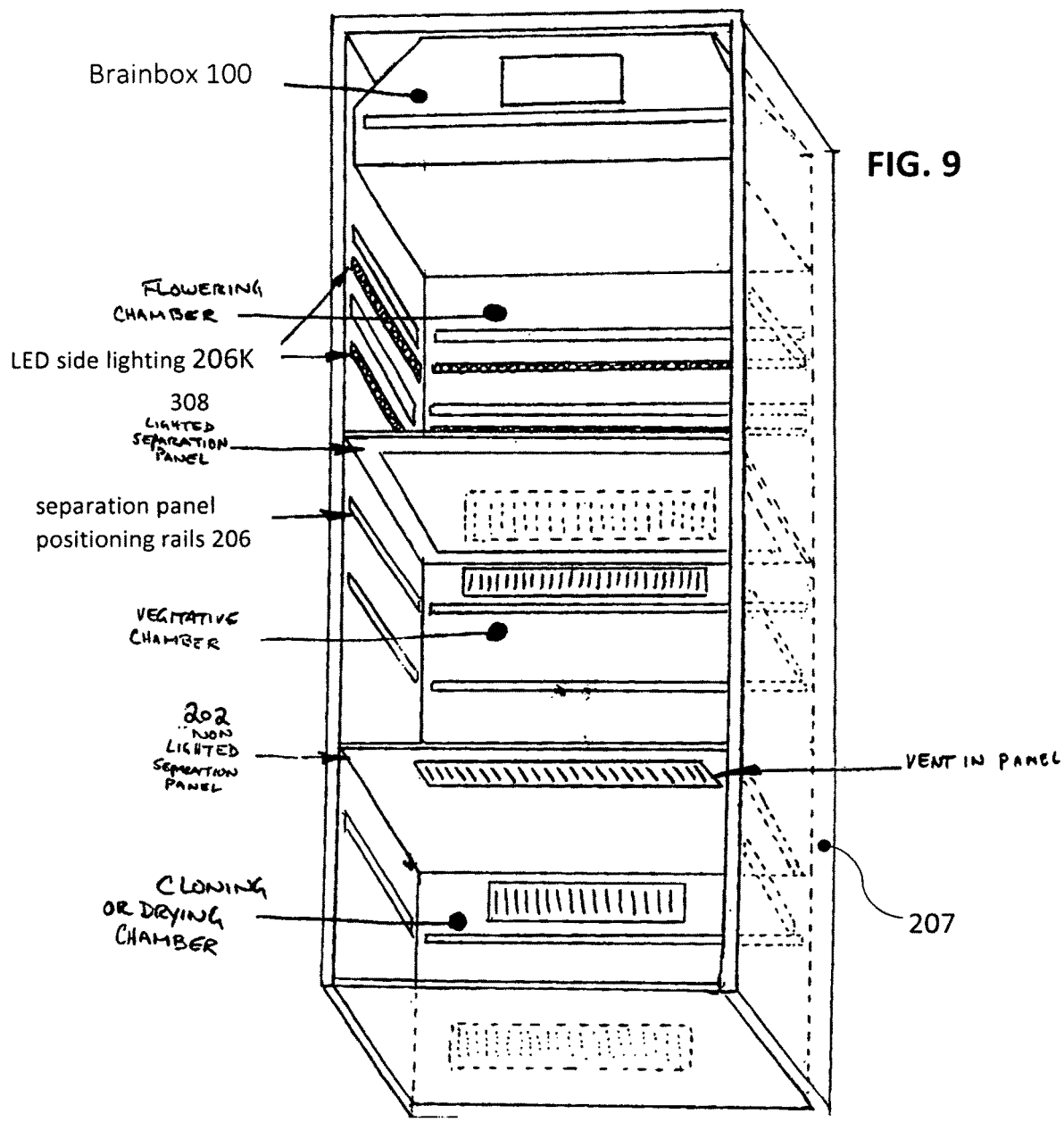
FIG. 9 is a similar view to FIG. 8 with the brainbox and two partitions in place.
Figure 12:
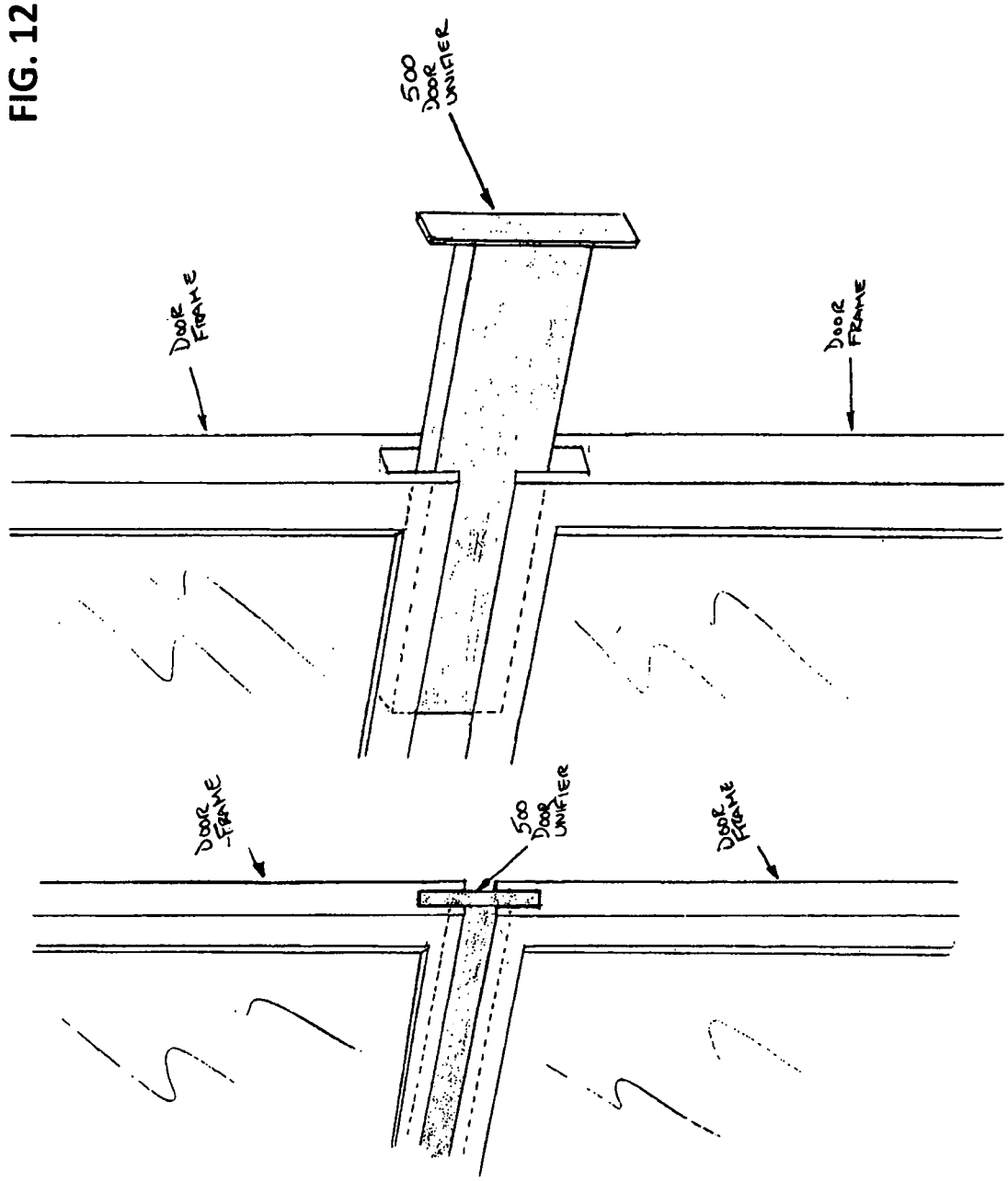
FIG. 12 is an oblique view of the door joined by the unifier and the door with the unifier withdrawn half way.
Figure 15:
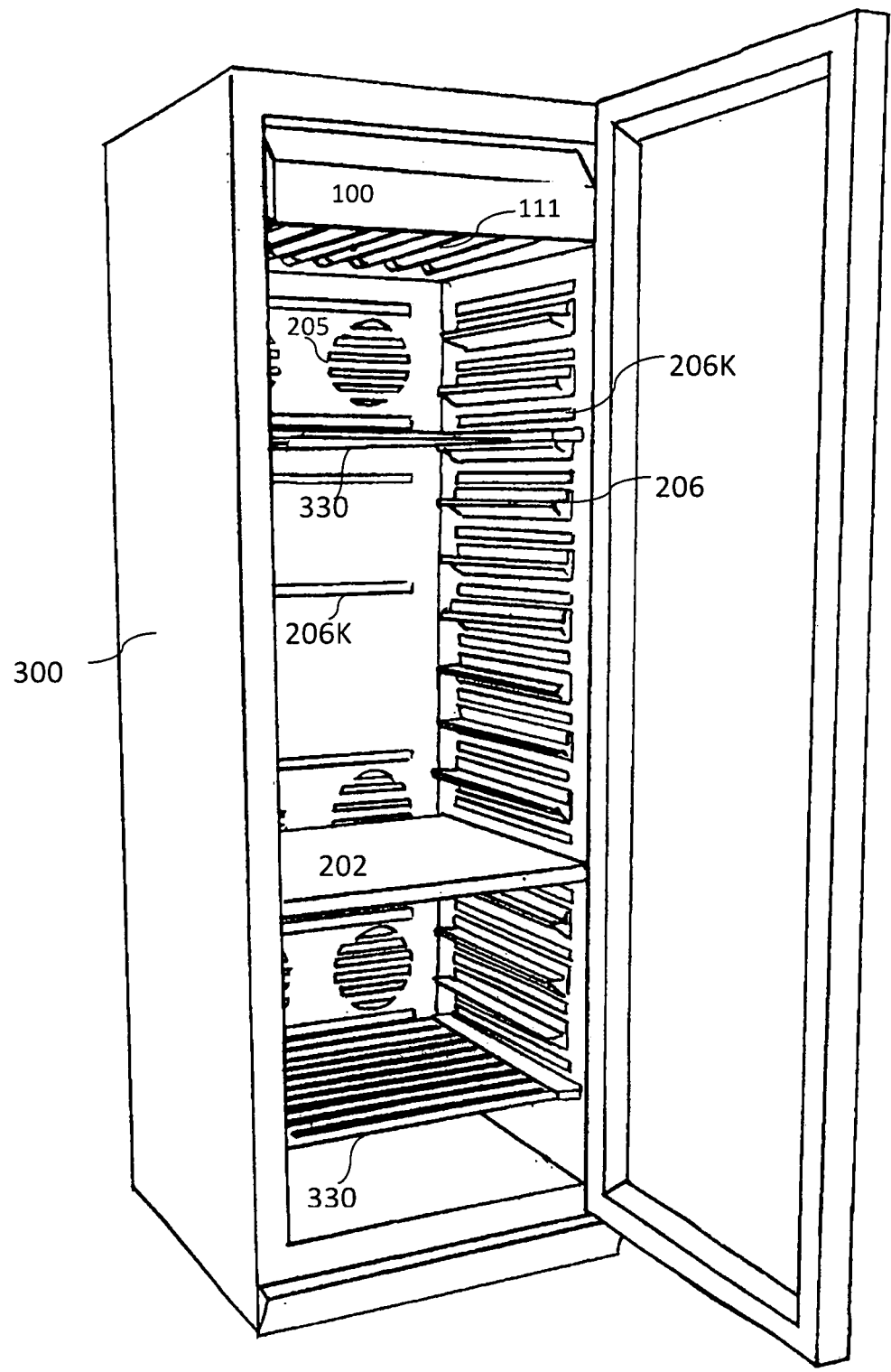
FIG. 15 is an oblique perspective view of the cabinet with its door open, showing the brainbox, a partition and two shelves.
Figure 16:
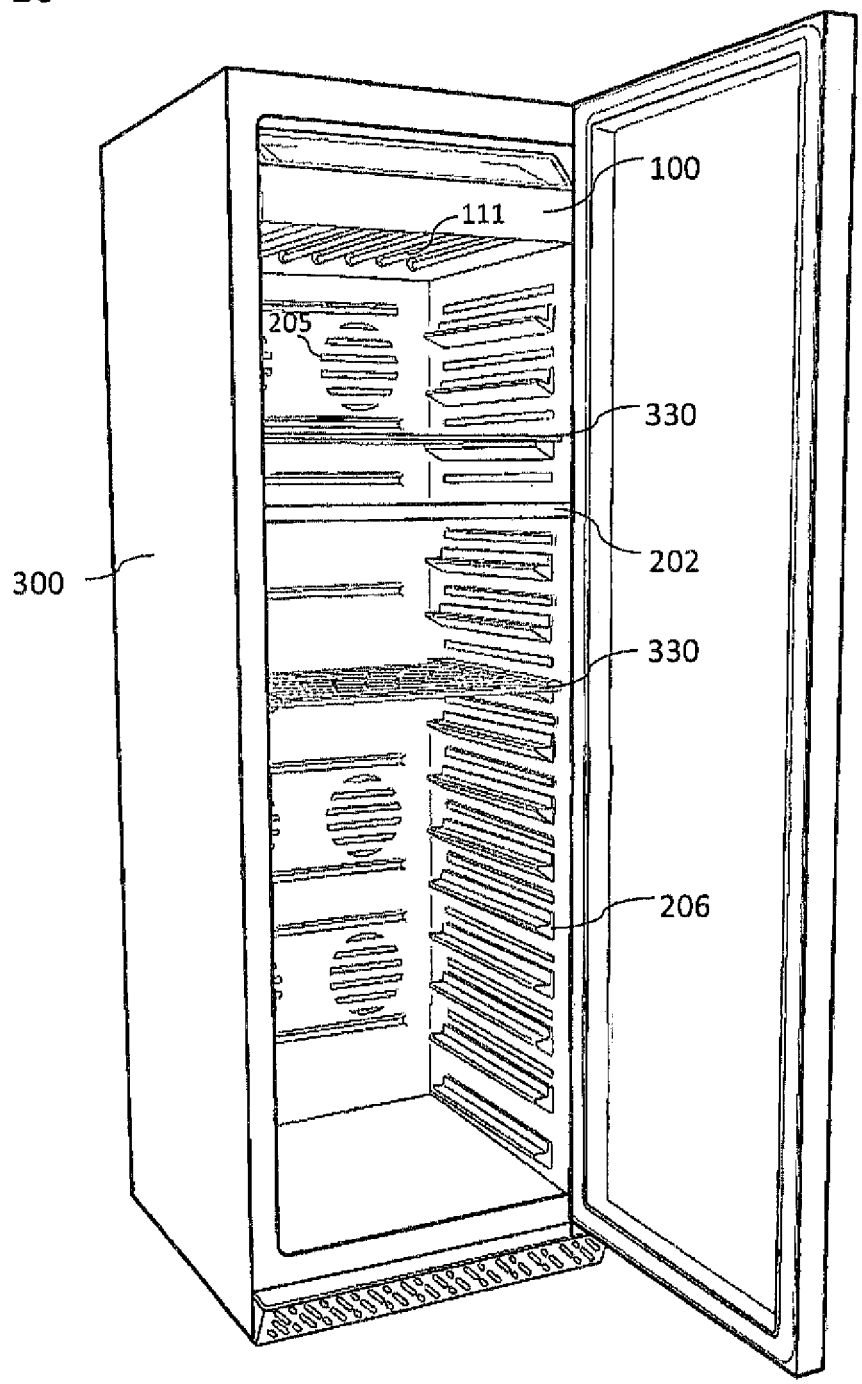
FIG. 16 is an oblique perspective view of the cabinet with its door open, showing the brainbox, a partition, and two wire-frame shelves.

An exemplary embodiment of an apparatus 300 that can receive the brainbox 100 is shown if FIGS. 8 & 9. The apparatus can have the shape of a cabinet or housing and can extend vertically upward such as a wine or beverage cooler. The apparatus can be of various sizes and dimensions. The apparatus can have an air tight sealed door on the front of the apparatus 300 that creates a negative pressure environment, which can be a single door or two separate doors, which can be joined. The door can be a two-pane glass door in some exemplary embodiments, which can be clear, tinted or blacked out, or can be constructed of any material, such as glass, metal, wood or plastic. A touch screen (preferably LED) can be provided on the inside and/or outside of the door or apparatus 300. The inside apparatus 300 can have lights on the sides 206K, rear and inside of the door at various heights for side lighting as seen in FIGS. 15, 16. The interior of the apparatus 300 can be of a reflective white color. In some exemplary embodiments, the apparatus 300 can have a single chamber or upper and lower chambers divided by a removable air tight and light proof divider 202. The divider 202 can be have lights to illuminate the chamber beneath it. Divider 202 may hermetically separate a plant space of apparatus 300 from a control space of apparatus 300, wherein apparatus 300 is a cabinet or housing.

The apparatus 300 can have a brainbox receptor 203, which can include "lock in" slides to receive the brain box 100. An exhaust port 204 can be provided on a top and rear portion to align with the ventilation slot of the brainbox 100. Circulation fans 205 can be provided for circulation of air within the apparatus 300. Rails or rollers 206 can be provided along the height of the apparatus on the side walls every few inches to provide multiple options to slide in partitions or shelves carrying the vegetation and/or plants. As shown in FIG. 8, rails 206 are spaced vertically along the sides 206C, parallel to each other. Stops 206A, as can be found in Summit brand beverage coolers can retain shelves 320,330,335 against the tray's back-stop. Stop 206A will prevent the tray from tipping, even if the shelf is slid out with a load on the shelf. To install the tray, slide the side edges along above the stop until a notch formed in each edge 206F is over the stop. A lifting pressure on the tray's front edge will cause the notch to fall past the stop, and the tray will then rest on the rails 206, with stop 206A preventing the tray from being pulled out too far and tipping.

The side walls of the apparatus 300 can have or accept panels of odor absorbing materials, such as but not limited to carbon or cedar.

In some exemplary embodiments, apparatus 300 can have a rear chamber 207 through which cooler ambient air is drawn in and moved throughout the grow space or spaces by way of circulation fans 205 as demonstrated in FIG. 10. with Brainbox 100 The apparatus 300 can accommodate and work in tandem and reservoir system 400. All lighting, ventilation and devices of apparatus 300 and 400 can be wirelessly monitored and controlled by switch 105 in Brainbox 100. Housing apparatus can have exhaust ducts in top and top rear wall. Exhaust ducts of housing apparatus 300 can align with exhaust ports of Brainbox 100. Exhaust ports 204 of housing apparatus 300 and exhaust ports 204 of Brainbox 100 can be adjoined by airtight rubber of foam seal.

In some exemplary embodiments, the housing apparatus 300 can have either a single door or double door 449 FIG. 11A. Double door 449 if has an upper door 450, a lower door 451, with optional conjoining adapter 500 as indicated in FIGS. 11A, 11B, 11C, and 12. Doors can be made of basic frame to accommodate panels made from several materials and in several styles. Panels are not limited to mirror, tinted glass, LED monitor screen or various wood, metal or plastic material for the purpose of match or blending with any existing cabinet, cabinets or decor. In some exemplary embodiments, LED monitor screen can display content of inspection camera 501 within Brainbox 100, or any predetermined image as selected by user.

Figure 14:
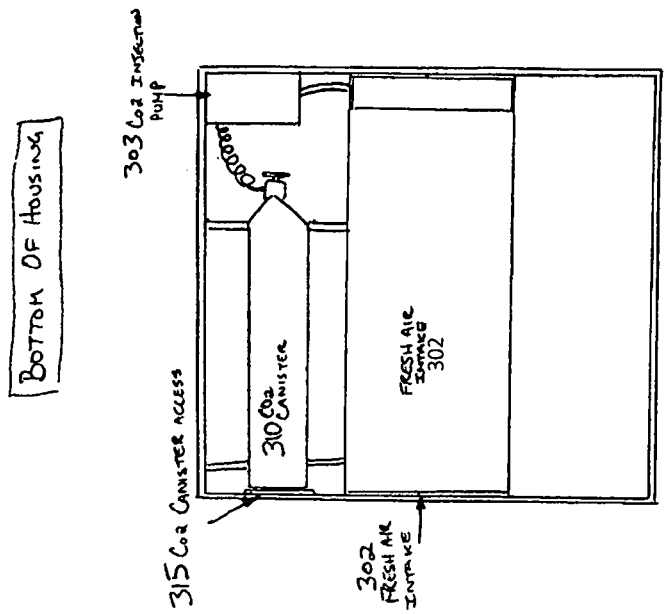
FIG. 14 is a top plan view of the bottom of the cabinet.
Figure 13:
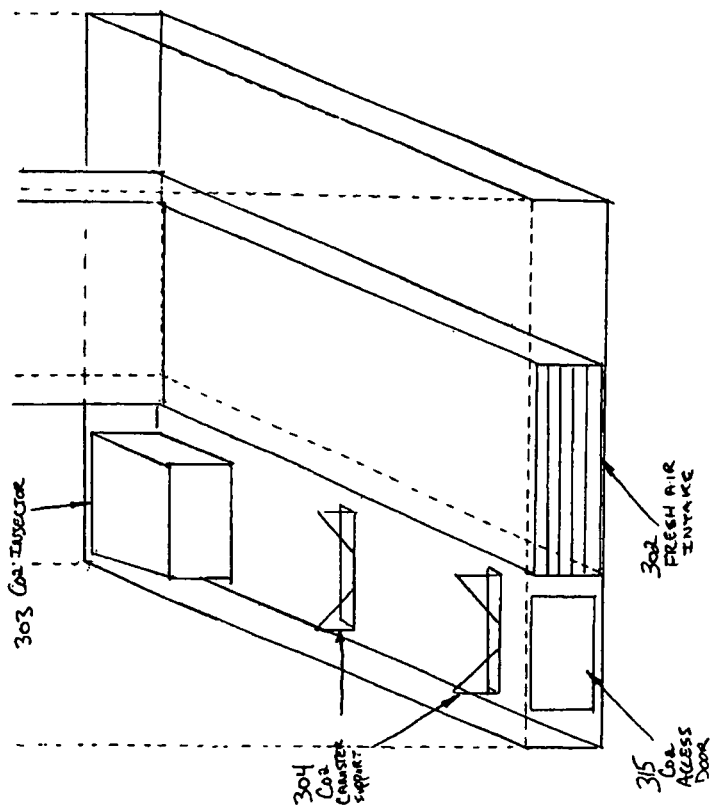
FIG. 13 is an oblique view of the bottom of the cabinet.

On the bottom of the apparatus 300, as shown in FIGS. 13,14, fresh air intake ports 302 can be provided with adjustable gate valves. A carbon dioxide injector 303 can be provided on a carbon dioxide canister support 304 to hold a carbon dioxide canaster 310 through an access door 315 provided on the front bottom of the apparatus 300. This allows carbon dioxide to enter the interior of the apparatus 300 through the air intake duct. Apparatus can have an air intake in bottom most chamber which can begin at the front bottom of the apparatus 300, leading to the rear of the apparatus 300 and connecting with the air channel behind the back panel of the apparatus 300 interior for the purpose of allowing fresh air to be circulated throughout the apparatus 300 as illustrated in FIG. 10.

FIG. 10 is an illustration of the air flow, showing a left side view, front view and right-side view of the apparatus 300. Various electrical connections can be provided for the interior of the apparatus 300. The apparatus 300 can be divided into multiple chambers, each chamber extending vertically upward and separated by removable horizontal partitions as illustrated in FIGS. 8, 9, 15, 16. Various plants and vegetation can be grown in each chamber. Some plants can require different light color spectrums and different light intensities to grow. Also, some plants can require varying light color spectrums and intensities as they transition through growth stages. For example, cannabis can require low intensity white/blue light during propagation and clone rooting, followed by higher intensity white/blue light during vegetative growth state followed by very intense red/yellow light during prime flowering state, followed by high intensity white/blue light during its final two weeks of flowering. Users can choose a generic white (e.g., full spectrum) light throughout all growth stages or choose a unique color spectrum/intensity cycle as needed for the specific vegetation they are growing in each chamber.

A second exemplary embodiment of an apparatus 300 is provided in FIG. 9. The apparatus 300 can be configured to provide multiple chambers of varying sizes using removable horizontal partitions to separate the apparatus into various chambers. A brainbox 100 can be provided on a top portion of the apparatus 300. Two chambers can be provided in the apparatus 300, such as a flowering chamber for growing flowering plants in a top portion and a vegetation chamber for growing vegetation in a bottom portion. In some exemplary embodiments, more than two chambers can be provided in the apparatus 300. A separate front door can be provided for each chamber. The top flowering chamber can have a retractable pulldown light blocking shade.

FIG. 17 is an oblique view of a horizontal partition 320 comprising a pull-out work shelf 321.

FIG. 17A is a front view off of the Dutch door 449 with the pull-out work shelf 321.

FIG. 17B is a side view off of the Dutch door 449 with the pull-out work shelf 321 pulled out to provide a work shelf 321.

A separation panel 308 can have lights and can have a control panel or display (preferably LCD) and a pull-out work shelf (FIGS. 17, 17A & 17B) or drawer between the two doors to the two chambers. In some exemplary embodiments, the pull-out work shelf 321 can be customized to receive a customized planting tray. Panel position rails can be provided on a side portion of the apparatus 300 along the sides of the apparatus 300 to place the removable horizontal panels 202, 308, 320, 330 and 335. The separation panel 308 can be of various configurations with or without lights, a pull-out work shelf, a drawer or a control panel (preferably LCD). Various removable partitions can be provided to divide a multiple chamber apparatus, as shown in FIG. 9. The panel can be lighted or non-lighted and separate the vegetation chamber from a cloning chamber or seeding chamber. Each chamber can have individual fresh air gate valves and a back panel. The lighting can be controlled by the brainbox 100 via switch 105 as described in paragraph 0004 as can any lighting in the separation panel. Panel or panels can be and shape or dimension and can be made of any material not limited to metal, plastic or polymer.

In some exemplary embodiments, housing apparatus 300 can have a water fogging system for the purpose of adding humidity to the environment inside the apparatus 300. Fogging system can be wirelessly controlled by switch 105 in Brainbox 100 as described in paragraph 0004 according to humidity level parameters established by user.

In some exemplary embodiments, housing apparatus can have wire rack style 330 or solid 335 movable shelves FIG. 18. Shelves can extend outward up to 90 percent of its length and be capable of supporting up to 50 pounds of weight.

Figure 19:
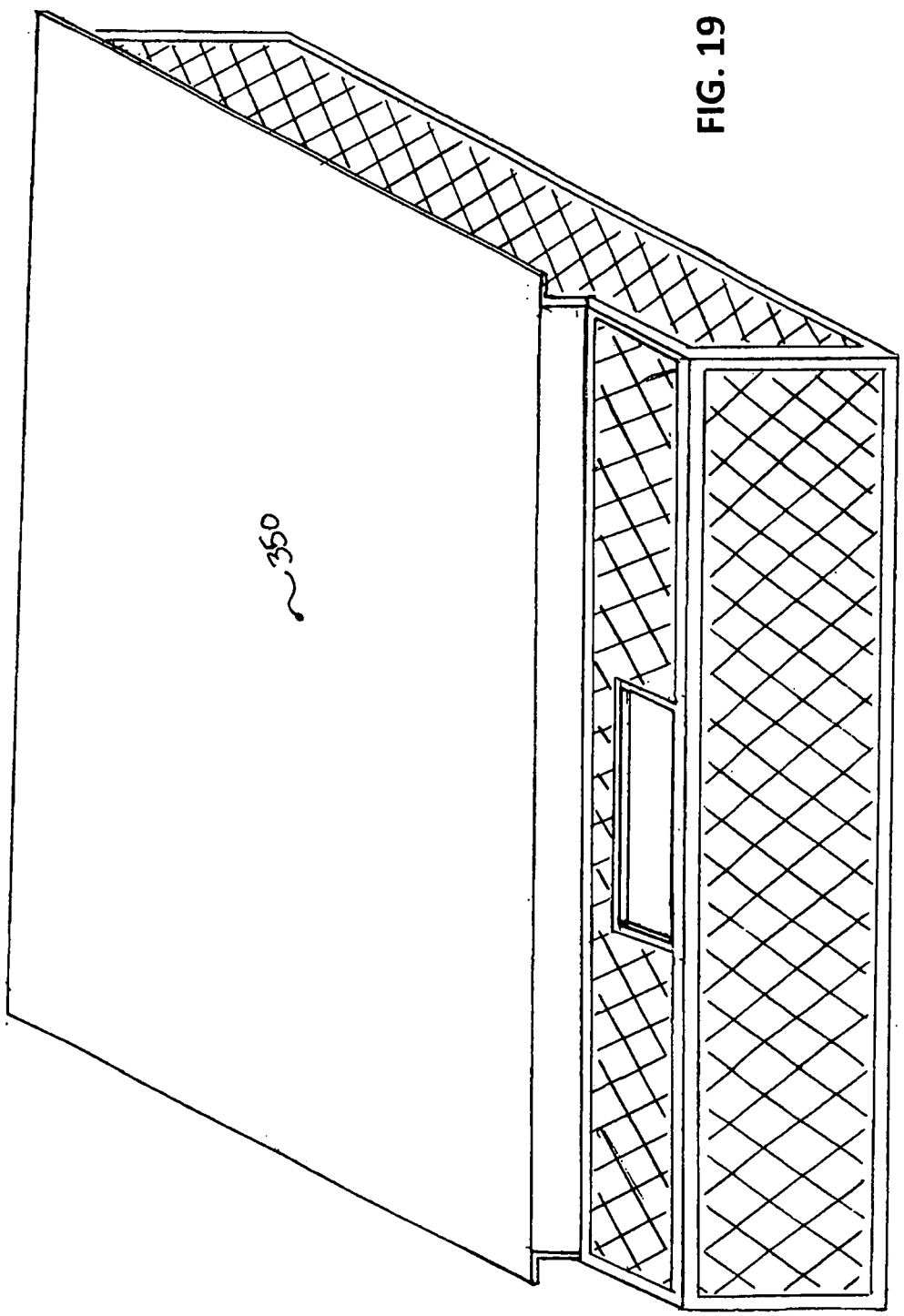
FIG. 19 is an oblique view of a removable drying and curing chamber.

In some exemplary embodiments, apparatus 300 can accommodate a removable herb drying and curing chamber 350 as seen in FIG. 19 and as described below.

A removable drying and curing chamber 350 can be provided and received by apparatus 300 FIG. 19. In some exemplary embodiments, drying and curing chamber 350 can attach to apparatus 300 by way of existing shelving/rack slides or supports. Drying and curing chamber 350 can have temperature and humidity sensors which can communicate with switch 105 in Brainbox 100 for monitoring and adjusting humidity, temperature and air flow for the purpose of drying and curing harvested vegetation. Communication with switch 105 can be wireless as described in paragraph 0004. In some exemplary embodiments, drying and curing chamber interior can be lined with cedar or odor absorbing material. In some exemplary embodiments, drying and curing chamber can have air intake portals, gate valves and fans, and can align with ventilation portals in rear panel of housing apparatus 300.

In some exemplary embodiments, housing apparatus 300 can be divided into two chambers by s separating partition 320. Separating partition 320 can have a pullout drawer that can have a retractable lid for the purpose of creating a shelf to be used as a work station. In some exemplary embodiments, the drawer can be lined with cedar or any other material that which can provide the same odor and moisture absorbing capability. In some exemplary embodiments, drawer can have fans and gate valves to control air flow and remove humidity for the purpose of drying and curing harvested vegetation. Fans and valves can be wirelessly controlled by switch 105 in Brainbox 100 as described in paragraph 0004.

Figure 20:
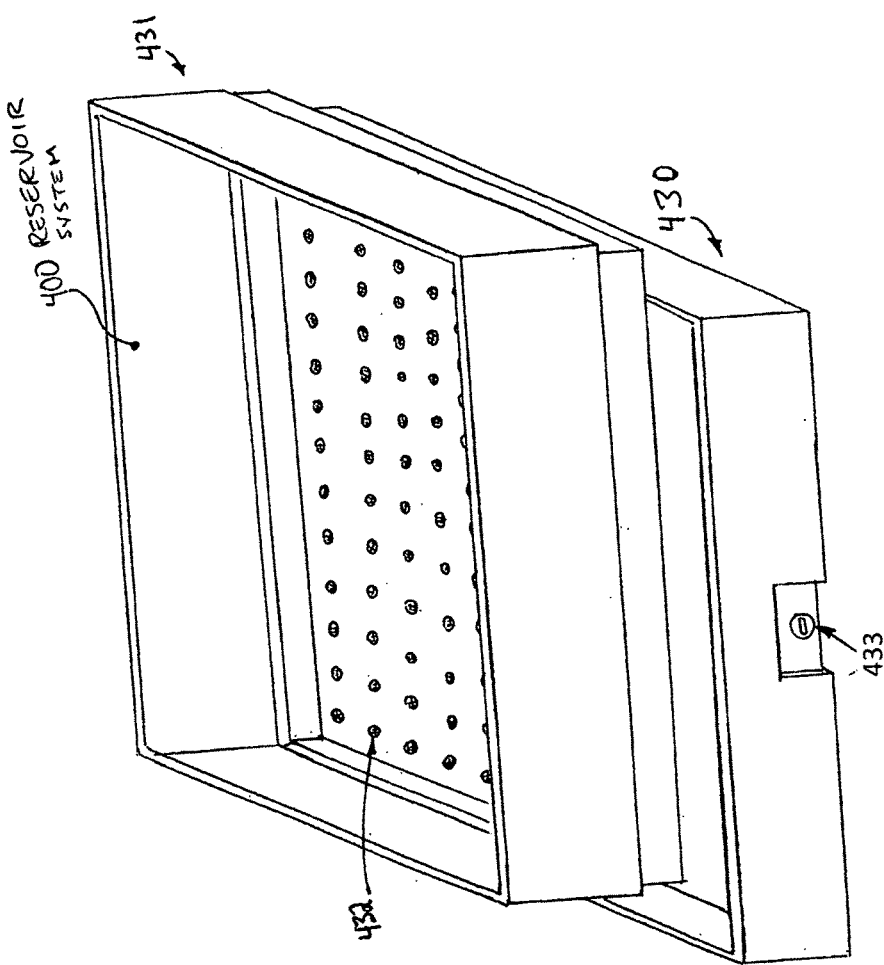
FIG. 20 is an oblique view of a reservoir system.
Figure 21:
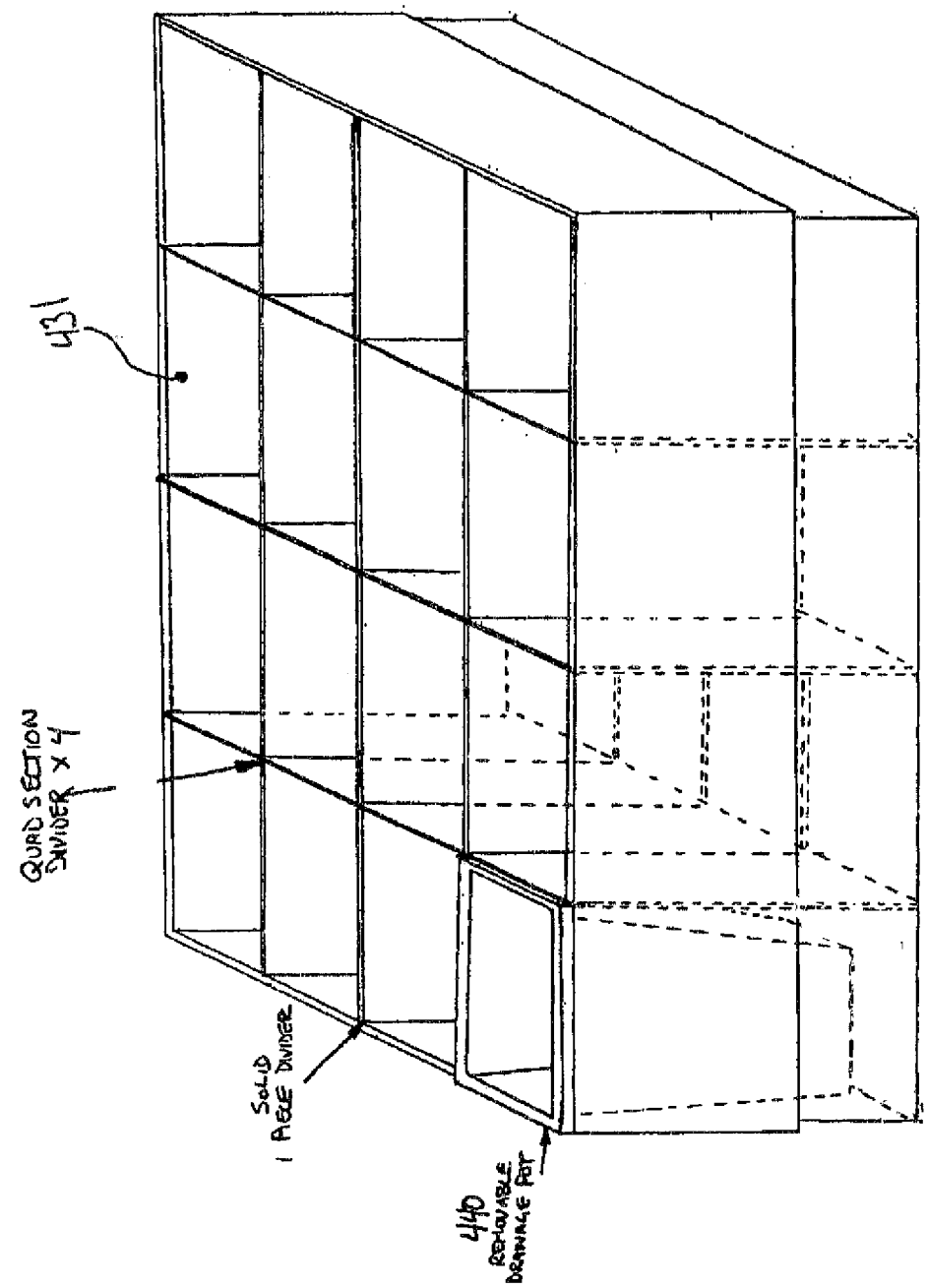
FIG. 21 is an oblique view of an alternate reservoir system.

A reservoir system 400 can be provided as shown in FIGS. 20 & 21. Reservoir system 400 can operate in tandem with and be wirelessly controlled by switch 105 in Brainbox 100 as described in paragraph 0004. Reservoir apparatus 400 can be accommodated by housing apparatus 300.

In some exemplary embodiments, additional LED lighting can be provided and accommodated by reservoir system 400. Additional lighting can be wirelessly controlled by switch 105 in Brainbox 100 as described in paragraph 0004.

In some exemplary embodiments, Reservoir apparatus 400 can include a lower drainage basin 430 and upper planting tray 431 as shown in FIGS. 20 & 21. Upper planting tray 431 can have mesh drainage openings 432 in the bottom as shown in FIG. 20. The upper tray 431 can be divided into multiple box sections, each of which can be configured to receive a removable planting pot or pots as illustrated in FIG. 21. Water can drain through the drainage holes in the planting pots through the drainage holes in the upper tray 431 into the lower tray 430. Lower drainage basin 430 can have a recessed drainage petcock 433 in front panel as shown in FIG. 20. In some exemplary embodiments, the upper tray 431 can hold up to but is not limited to 20 individual planting pots. The upper and lower trays can be provided into a chamber into the apparatus 300 described above.

Figure 22:
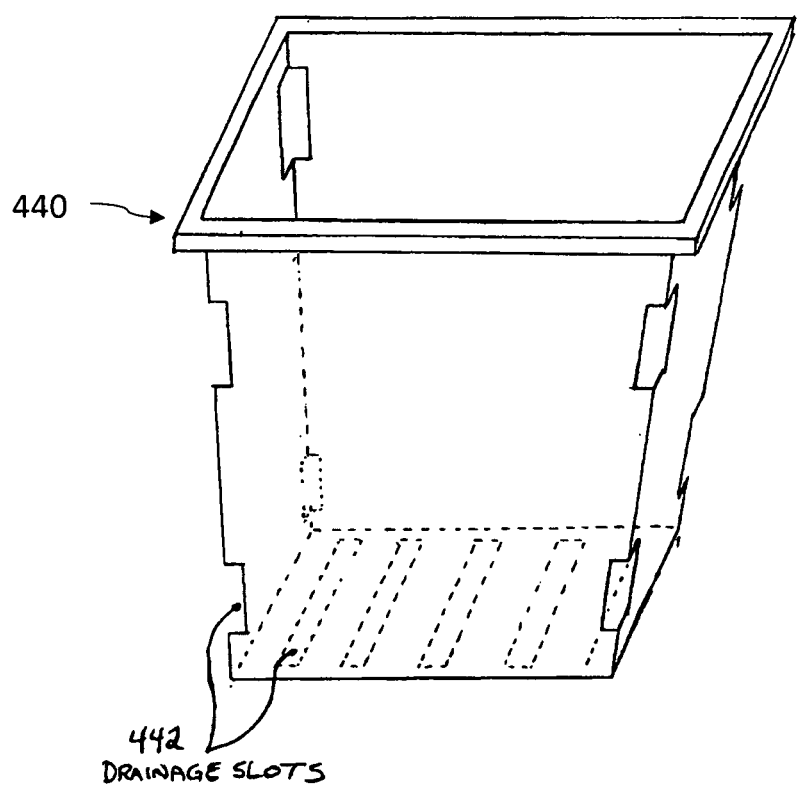
FIG. 22 is an oblique view of a removable planting pot.
Figure 23:
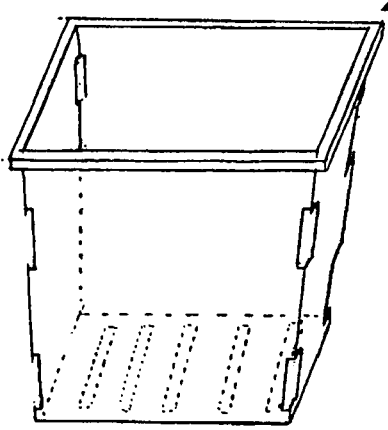
FIG. 23 is an oblique view of a removable planting pot.
Figure 24:
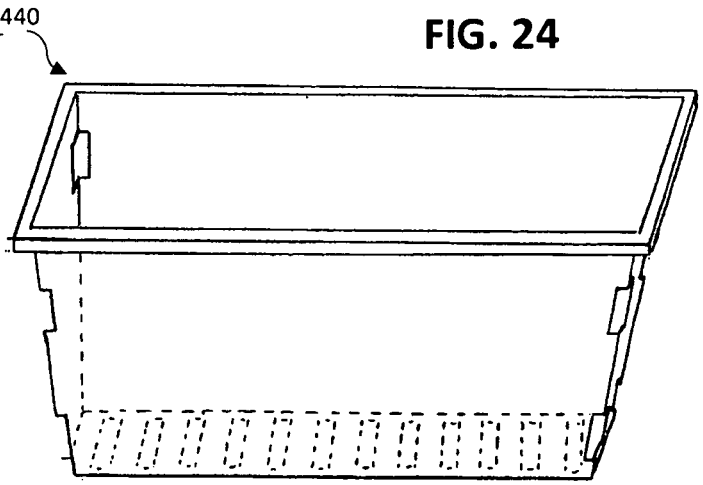
FIG. 24 is an oblique view of a removable planting pot.

FIGS. 22, 23 and 24 illustrate removable planting pots 440 which can be accommodated by reservoir 400 to fit symmetrically into upper planting tray 431. Planting pots 440 can be of either reusable or disposable material. Planting pots can have drainage slots 442 in bottom and sides as indicated in FIGS. 22,23 and 24. Removable planting pots can be made of but not limited to plastic material. Removable planting pots can be of various sizes as necessary to fit symmetrically into upper tray of reservoir apparatus 400 in various combinations.

In some exemplary embodiments, Reservoir apparatus 400 can include a removable pump which can be wirelessly controlled by switch 105 in Brainbox 100 as described in paragraph 0004. Pump can attach to tubular manifold system for purpose of distributing water and nutrients from lower drainage basin 430 to planting pots 440.

In some exemplary embodiments, the upper tray 431 can have exterior wall with mounting holes for a lighting system as described above. Light engines can be provided and constructed to be inserted within the upper tray 431, which can be used for providing various lighting cycles and spectrums, as described above for plant growth. In some exemplary embodiments, a pumping system having a pump with a misting nozzle for providing and auto feeding and humidifying system that can be inserted into a box section in the upper tray 30, which can be the same size as for the planting pots. The pumping system can be used for providing water and nutrients to the plants pots.

The upper tray, lower tray and planting pots are not restricted to any size, shape or dimension. In some exemplary embodiments, the upper tray 431 can be sized narrower at a bottom portion than at a top portion to fit inside the lower tray 430.

The apparatus and brainbox can have various shapes and configurations, and are not limited to any shape or configuration, Various materials can be used for the construction of the apparatus and brainbox. Various lights can be used for various cycles, intensities and spectrums, which can be based on the vegetation growing inside the apparatus, the lights can be removable and provided in various locations, such as vertically, horizontally and in individual chambers. Various logos, graphics or production information can be provided on the apparatus or brainbox. Various components can be provided together, or individually. For example, the brainbox, apparatus and reservoir system can each be provided separately, or together as one system.

Figure 26:
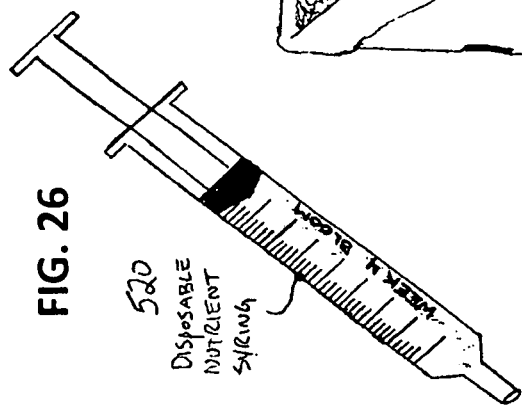
FIG. 26 is a nutrient formula in a disposable syringe.
Figure 25:
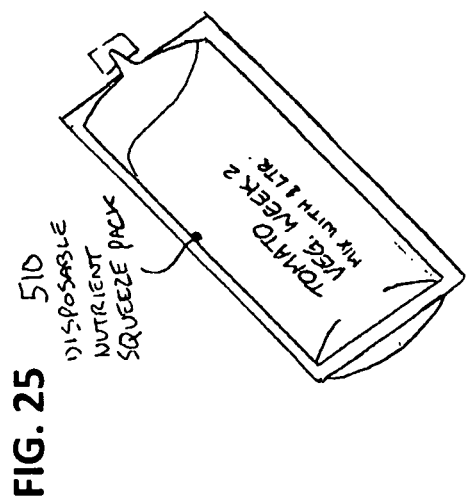
FIG. 25 is an elevation of a nutrient liquid in a disposable squeeze pack.

In some exemplary embodiments, individually packaged nutrient formulas can be provided for the purpose of feeding plants nutrient formulas that are specifically engineered for the particular type of plant being grown and at a particular stage of growth. In some exemplary embodiments, nutrient formulas can be provided inside a disposable squeeze pack 510 or syringe 520 or any other vehicle which would provide the necessary storage and dispensary capabilities. (FIGS. 25,26) Nutrient formulas can be dosed in quantities that are specific to any number of pre-established quantities of water. For example, a plant in its flowering or fruiting stage that is in a two-gallon capacity planting pot can require one liter of water mixed with one ounce of a nutrient formula that is engineered to provide the exact nutrients that plant needs in order to thrive and grow larger, richer produce. A user would select the plant and growth stage specific formula pack or packs that match the amount of water with which it will be mixed, mix them together and pour it into the soil or medium, whereby eliminating the need to study plant nutritional needs and eliminate the need to calculate each individual nutrient dose for each plant and for each amount of water. This will also eliminate the need to store large containers of nutrients which will spoil over time. All of the science of professional cultivation is incorporated to provide a simple two-step process to high grade cultivation for any user regardless of knowledge or experience. In some exemplary embodiments, nutrient formula packs can be measured according to each pot 440 size provided by reservoir apparatus 400. Nutrient formula packs can be mixed with water and poured directly into reservoir system 400 and dispensed by pump and manifold system of reservoir apparatus 400.

Figure 27:
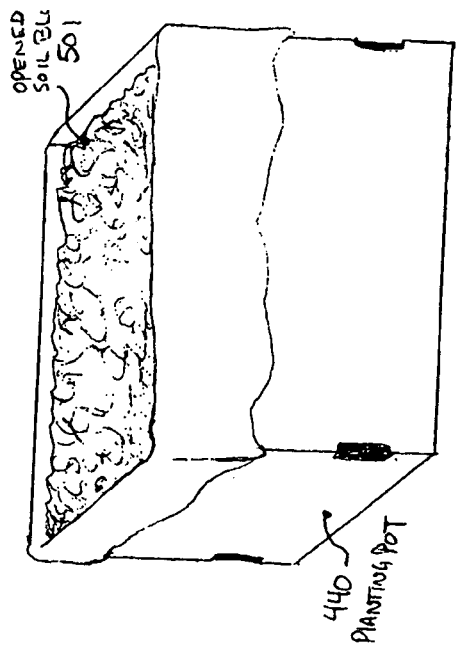
FIG. 27 is an oblique view of an open block of soil for use with the reservoir apparatus.
Figure 28:
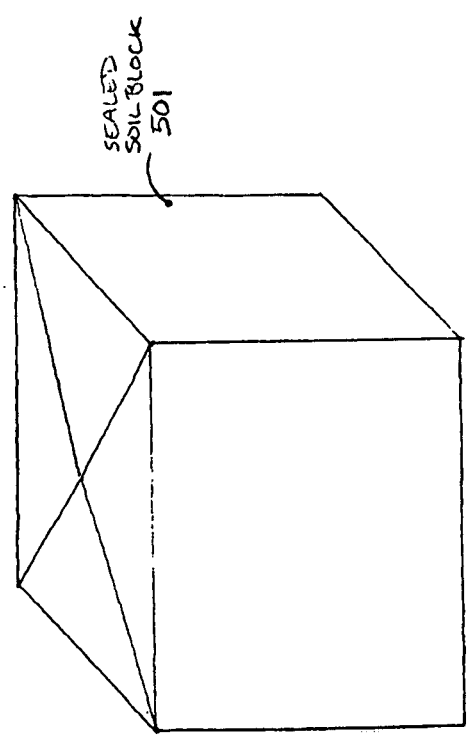
FIG. 28 is an oblique view of a sealed block of soil for use with reservoir apparatus.

In some exemplary embodiments, blocks of soil 501 (FIGS. 27 & 28) can be provided for use with reservoir apparatus 400. In some exemplary embodiments, soil blocks 501 can be provided in various sizes as needed to fit into variably sized planting pots 440 as illustrated in FIG. 27. Soil blocks 501 can contain various grow medium materials such as but not limited to soil, compost or coco coir which can be in its natural state or impregnated with plant specific nutrient formulas. With Impregnated mediums, users would only have to add water as needed for optimal growth.

In some exemplary embodiments, soil blocks can be made of material that will dissolve over time when combined with water.

In some exemplary embodiments, printed, online and video format instructional tutorials can be provided. Instructional tutorials can contain but are not limited to content such as basic herb and garnish production, fruit and fruiting vegetable production, advanced fruit and vegetable production, basic hemp, ruderalis and cannabis production, advanced growth techniques, advanced plant training techniques, advanced cannabis production techniques, and cyclical endless harvest growth. In some exemplary embodiments, instructional tutorials can be combined with and work in tandem with automation software application described above.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, manufacture and methods which, although not explicitly show or described herein, embody the principals of the disclosure and are thus within the spirit and scope of the disclosure.

We claim:

1. An apparatus installable in a cabinet for growing plants, the apparatus comprising:
   a divider,
   said divider hermetically separating a plant space of the apparatus from a control space of the apparatus;
   said divider having a plant side and a control side;
   a plurality of electro-magnetic radiation (EMR) emitters, mounted on the plant side of the divider;
   wherein said plurality of EMR emitters is adapted to emit EMR emissions at a plurality of different frequencies primarily at or near visible light;

a filtered vent in the divider;
said filtered vent having a primary filter comprising activated charcoal and a secondary filter comprising activated charcoal, the secondary filter dividing the control space of the apparatus;
a third space between the primary filter and the secondary filter;
an ionizer within the third space;
wherein the primary filter, the secondary filter and the ionizer are odor suppressors;
a fan for pulling air through the filtered vent;
a microprocessor controlling said fan, plurality of EMR emitters and a time, duration, and frequency of the EMR emissions of said plurality of EMR emitters;
a thermometer disposed on the plant side of said divider and connected to said microprocessor, wherein said microprocessor is responsive to said thermometer by controlling said fan.

2. The apparatus according to claim 1 in which:
the EMR emitters comprise infra-red emitters; and
the microprocessor is responsive to the thermometer by controlling infra-red emitters, said infra-red emitters emitting heat into the plant side to raise the temperature to a programmed temperature.

3. The apparatus according to claim 2 further comprising:
a $CO_2$ concentration sensor;
a $CO_2$ emitter;
the microprocessor is responsive to a $CO_2$ concentration, when less than a programmed $CO_2$ concentration, by releasing $CO_2$ from said $CO_2$ emitter until the concentration is at the programmed $CO_2$ concentration.

4. The apparatus according to claim 3 further comprising:
a pressurized $CO_2$ supply canister, supplying the $CO_2$ to the $CO_2$ emitter.

5. An apparatus installable in a cabinet for growing plants, the apparatus comprising:
a divider,
said divider hermetically separating a plant space of the apparatus from a control space of the apparatus;
said divider having a plant side and a control side;
a plurality of electro-magnetic radiation (EMR) emitters, mounted on the plant side of the divider;
wherein said plurality of EMR emitters is adapted to emit EMR emissions at a plurality of different frequencies primarily at or near visible light;
a filtered vent in the divider;
said filtered vent having a primary filter comprising granular carbon and titanium dioxide and a secondary filter comprising granular carbon and titanium dioxide, the secondary filter dividing the control space of the apparatus;
a third space between the primary filter and the secondary filter;
an ultraviolet-emitting LED within the third space;
wherein the primary filter, the secondary filter and the ultraviolet-emitting LED are odor suppressors;
a fan for pulling air through the filtered vent;
a microprocessor controlling; said fan, said plurality of EMR emitters and a time, duration, and frequency of the EMR emissions of said plurality of EMR emitters;
a thermometer disposed on the plant side of said divider and connected to said microprocessor, wherein said microprocessor is responsive to said thermometer by controlling said fan.

6. The apparatus according to claim 5 in which the plant space contains a humidity sensor.

7. The apparatus according to claim 5 in which the plurality of electro-magnetic radiation (EMR) emitters, are LEDs mounted on the plant side of the divider;
said LEDs are mounted on a circuit board within a plastic tube;
said plastic tube transmits light from the LEDs.

8. The apparatus according to claim 7 in which
a rear of the of the divider has a receptacle for mounting and connecting said plastic tube to a power source;
a front of the divider has an unpowered receptacle for mounting said plastic tube; said plastic tube has two mounting and connecting pins, mountable and connectable to the rear receptacle; and
said plastic tube has two mounting pins, mountable to the front receptacle.

* * * * *